US011477988B2

(12) United States Patent
Meerdink et al.

(10) Patent No.: US 11,477,988 B2
(45) Date of Patent: Oct. 25, 2022

(54) OVERHANG RAIL TRANSPORT SYSTEM

(71) Applicant: MAREL MEAT B.V., Boxmeer (NL)

(72) Inventors: Jan Johannes Meerdink, Ravenstein (NL); Franciscus Theodorus Henricus Johannes Van Der Steen, Megen (NL); Adriaan Ebergen, Lith (NL); Ronald Kranenbarg, S-Hertogenbosch (NL)

(73) Assignee: MAREL MEAT B.V., Boxmeer (NL)

( * ) Notice: Subject to any disclaimer, the term of this patent is extended or adjusted under 35 U.S.C. 154(b) by 0 days.

(21) Appl. No.: 17/605,444

(22) PCT Filed: May 1, 2020

(86) PCT No.: PCT/EP2020/062201
§ 371 (c)(1),
(2) Date: Oct. 21, 2021

(87) PCT Pub. No.: WO2020/225152
PCT Pub. Date: Nov. 12, 2020

(65) Prior Publication Data
US 2022/0142185 A1 May 12, 2022

(30) Foreign Application Priority Data

May 3, 2019 (NL) ..................................... 2023063

(51) Int. Cl.
*B65G 47/53* (2006.01)
*B65G 47/52* (2006.01)
(Continued)

(52) U.S. Cl.
CPC ............ *A22B 7/005* (2013.01); *B65G 17/485* (2013.01); *B65G 47/53* (2013.01); *B65G 2201/0202* (2013.01)

(58) Field of Classification Search
CPC ...... B65G 47/52; B65G 47/53; B65G 17/485; A22B 7/00; A22B 7/005
(Continued)

(56) References Cited

U.S. PATENT DOCUMENTS 3,077,997 A    2/1963  Toennies
3,736,622 A *  6/1973  Wallace .................. A22B 7/003
                                                        198/465.4
(Continued)

FOREIGN PATENT DOCUMENTS

CN       104427880 A     3/2015
DE         370267 C      1/1939
(Continued)

OTHER PUBLICATIONS

International Search Report and Written Opinion from PCT Application No. PCT/EP2020/062201, dated Jul. 13, 2020.
(Continued)

*Primary Examiner* — Douglas A Hess
(74) *Attorney, Agent, or Firm* — Workman Nydegger

(57) ABSTRACT

A system and a method for automatic transfer of carcass parts suspended from a first carrier to being suspended from a second carrier. The carcass parts may be a half carcass that may have been eviscerated and cleaned. The first carrier may be an industry standard gambrel or a single carrier or a Marel DeboFlex carrier, for example a Euro Carrier. The second carrier may be a single carrier, for example a Euro Carrier, or a Marel DeboFlex carrier.

22 Claims, 12 Drawing Sheets

(51) Int. Cl.
*A22B 7/00* (2006.01)
*B65G 17/48* (2006.01)

(58) Field of Classification Search
USPC .......................................................... 452/182
See application file for complete search history.

(56) References Cited

U.S. PATENT DOCUMENTS

| | | | |
|---|---|---|---|
| 4,423,808 A | | 1/1984 | Venturelli |
| 4,570,295 A | * | 2/1986 | van Mil ............. A22C 21/0053 452/182 |
| 4,756,401 A | * | 7/1988 | Kempton ................ B65G 47/61 198/463.3 |
| 4,838,036 A | * | 6/1989 | Norrie .................... A22B 7/005 452/187 |
| 4,856,144 A | * | 8/1989 | de Greef ............... B61B 10/025 198/465.4 |
| 5,106,336 A | * | 4/1992 | Gwyther ................. A22B 5/161 452/187 |
| 5,340,351 A | * | 8/1994 | Minderman ....... A22C 21/0053 452/183 |
| 5,344,360 A | * | 9/1994 | Hazenbroek ....... A22C 21/0053 452/183 |
| 5,354,230 A | * | 10/1994 | McFarlane ........... A22C 15/001 211/113 |
| 5,487,700 A | * | 1/1996 | Dillard ............... A22C 21/0007 452/179 |
| 6,523,462 B1 | * | 2/2003 | Johnson ............... A22C 15/001 198/465.4 |
| 8,105,138 B2 | * | 1/2012 | Van Den Nieuwelaar .................. A22C 21/0038 452/177 |
| 9,271,506 B2 | | 3/2016 | Janssen et al. |
| 10,130,107 B2 | * | 11/2018 | Winkelmolen .... A22C 21/0053 |
| 10,743,553 B2 | * | 8/2020 | Van Steijn et al. |
| 11,013,241 B2 | * | 5/2021 | Van Berkel et al. |
| 11,102,989 B2 | * | 8/2021 | Van der Waal et al. |
| 2015/0173376 A1 | | 6/2015 | Janssen et al. |

FOREIGN PATENT DOCUMENTS

| | | |
|---|---|---|
| EP | 0300940 A1 | 1/1989 |
| EP | 1152664 B1 | 5/2006 |
| GB | 2025883 A | 1/1980 |
| GB | 2079712 A | 1/1982 |
| GB | 2464600 A | 4/2010 |
| WO | 0048468 A1 | 8/2000 |
| WO | 2005099459 A1 | 10/2005 |
| WO | 2014007607 A1 | 1/2014 |

OTHER PUBLICATIONS

Search Report from corresponding NL Application No. NL2023063, dated Jan. 10, 2020.
Search Report from corresponding Chinese Application No. 202080031928.X, dated Mar. 21, 2022.
Office Action from corresponding Chinese Application 202080031928. X, dated Mar. 29, 2022.

* cited by examiner

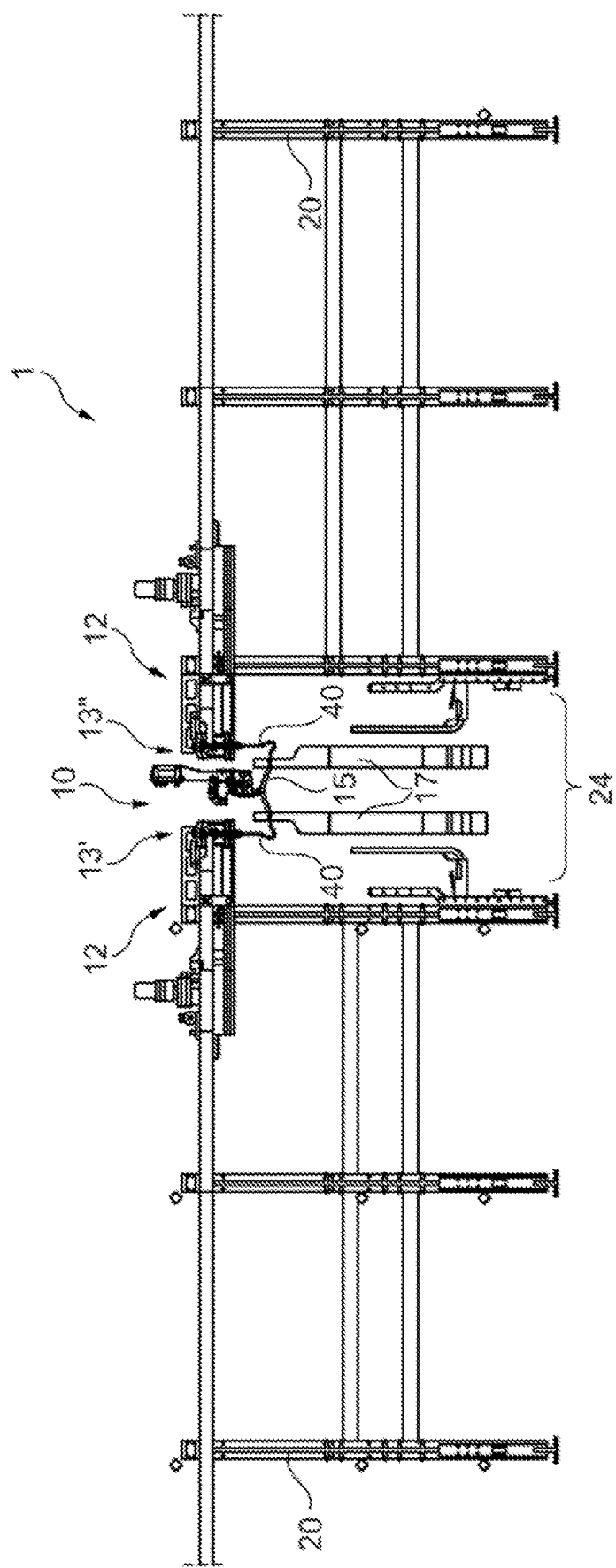

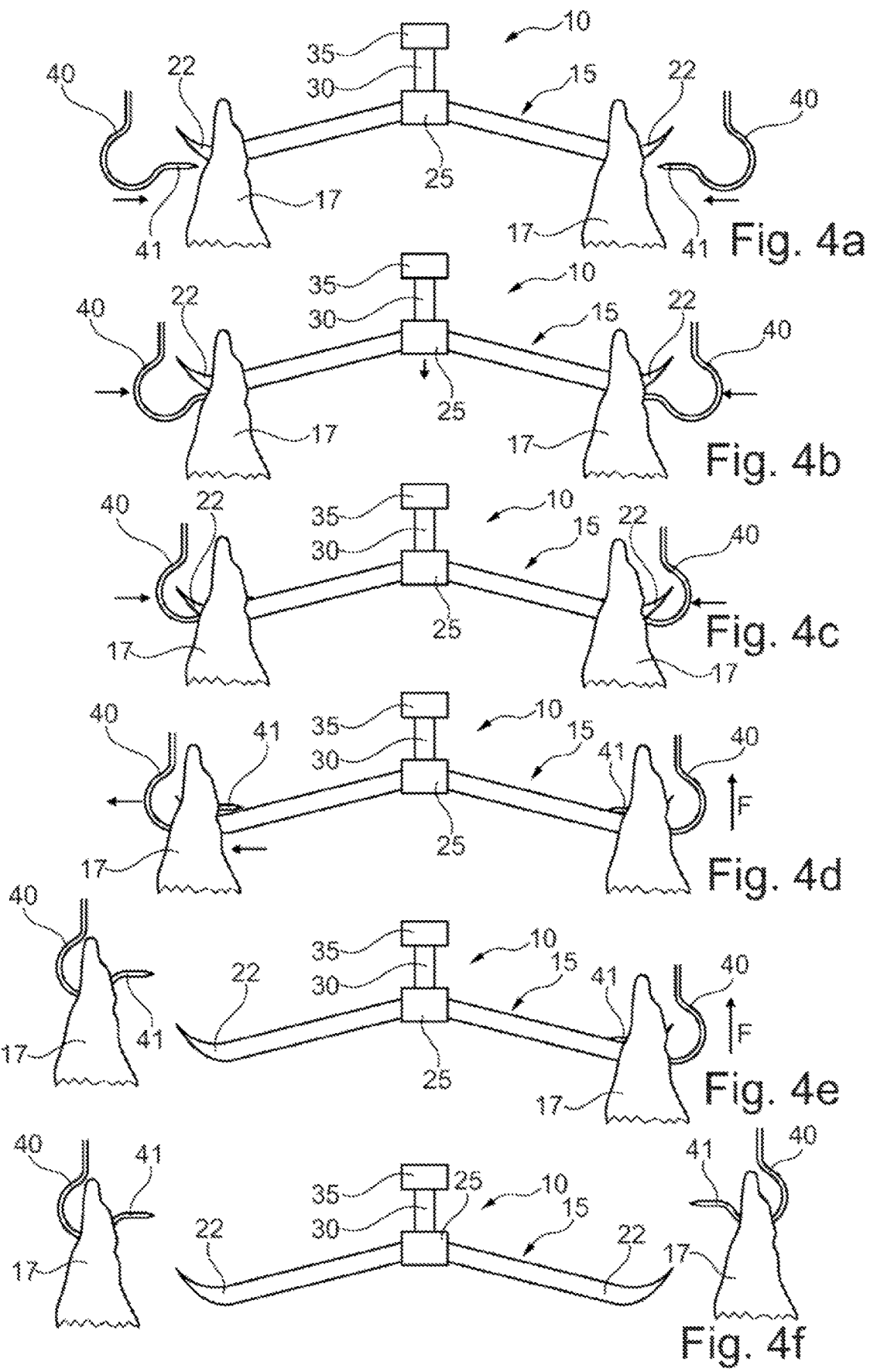

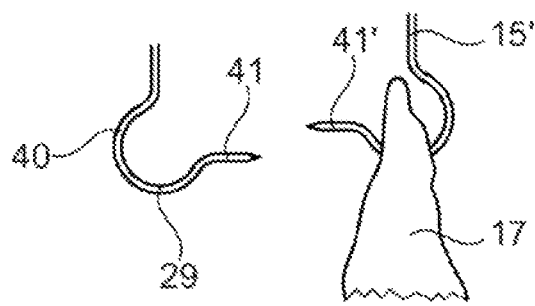
Fig. 5a  Fig. 6a
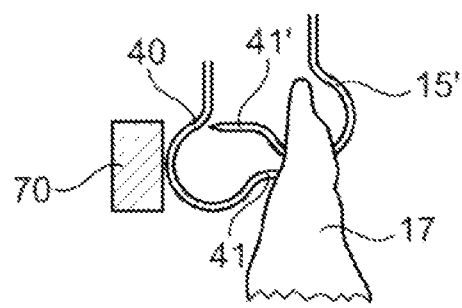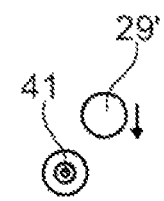
Fig. 5b  Fig. 6b
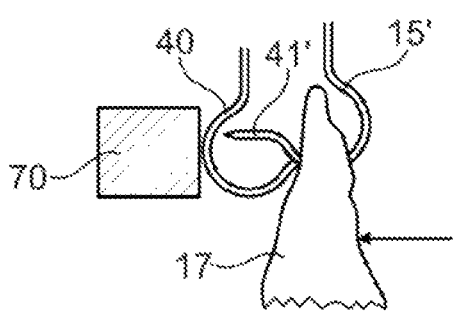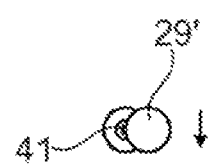
Fig. 5c  Fig. 6c
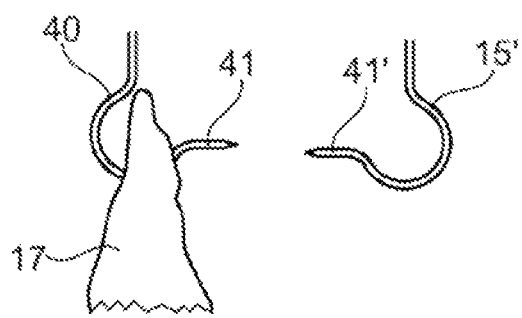
Fig. 5d  Fig. 6d

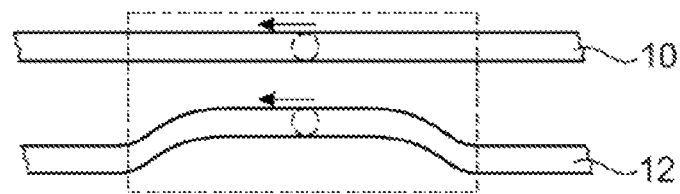
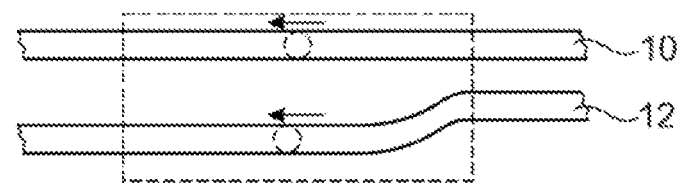
Fig. 9
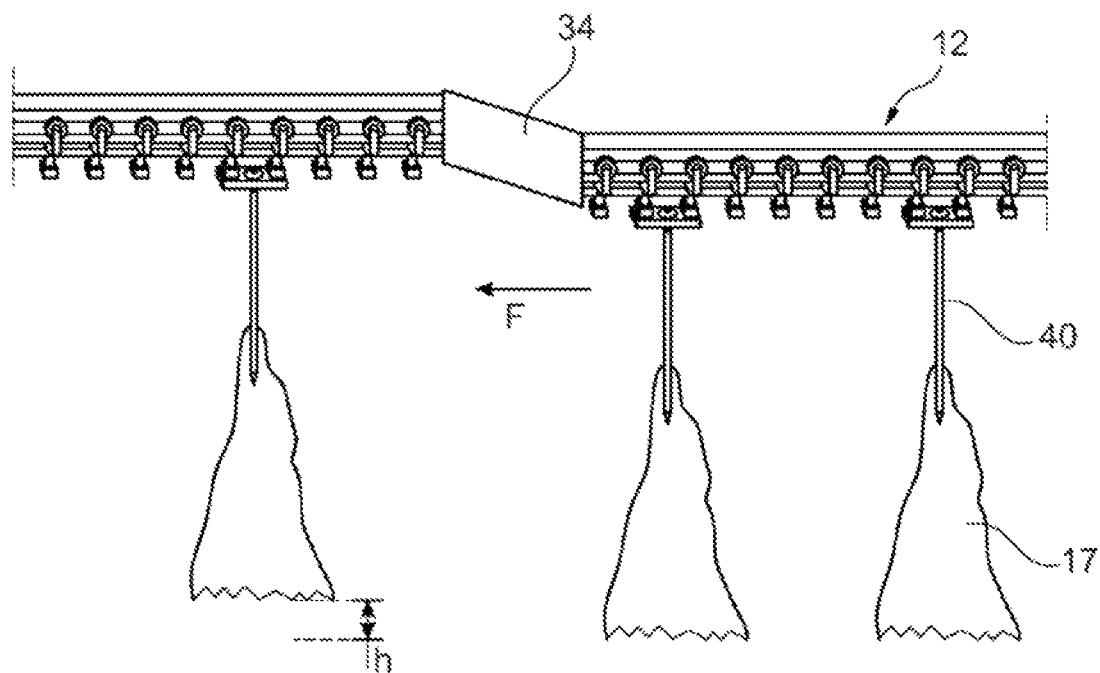
Fig. 10

OVERHANG RAIL TRANSPORT SYSTEM

FIELD OF THE INVENTION

The present invention relates to the transport of four-legged slaughter animal carcass parts hanging suspended from carriers engaging in openings in leg portions of the carcass parts. More particularly, it relates to the transfer of a carcass part from one carrier to another carrier.

BACKGROUND OF THE INVENTION

It is known to transport slaughter animal carcass parts hanging suspended from carriers engaging in openings in leg portions of the carcass parts. The carcass parts may be a half carcass that has been eviscerated and cleaned. The carriers used may be of the gambrel type, having two opposed carrier ends pointing away from each other and being tied together with a cross bar. The cross bar has a hanging arrangement that cooperates with an overhead transport conveyor system. Another type of carrier may be the Euro Hook variant, having a pointed end and a carrier portion shaped like a fishing carrier. The Euro Hook also has a hanging arrangement that cooperates with an overhead transport conveyor system similar to that used for gambrels. The single carriers may comply with DIN 5047 (Carriers for meat and other food; tubular track sliding carrier).

For example, EP1152664B1 (Butina APS) discloses transferring half pig carcasses hanging from each end of a gambrel engaging in first openings in the carcasses whereafter a suspension means, e.g. a single carrier, is attached to engage the calcaneal tendon, thus a second opening in the carcasses as is shown in FIG. 5. The gambrel is then removed from the first openings and each carcass half is transported separately away for deboning and other processing. This process is labour intensive, putting a maximum limit on the throughput speed of the system.

WO2005/099459A1 (K. J. Maskinfabriken A/S) discloses transferring half carcasses, hanging from carriers of an overhead conveyor, to a horizontal conveyor belt by temporarily gripping and holding the carcass sides, cutting the sinews through and cutting the hind foot/toe to release the rest of the carcass onto the belt. This, and variations on this technology, is common in the industry, but has the disadvantage that the further deboning has to take place on a horizontal surface with heavy lifts for operators and limited opportunities for automation of processes.

U.S. Pat. No. 4,423,808 describes an apparatus is disclosed for unhooking and transferring hung articles, such as cuts of meat, from haulage vehicles to sorting and warehousing installations. The apparatus includes a gripping mechanism movable in three respectively orthogonal directions. The gripping mechanism is adapted to withdraw the articles from the hooks on which they are initially hung, and to transfer and re-hang them upon other hooks.

SUMMARY OF THE INVENTION

One object of the invention is to provide a system and a method for automatic transfer of carcass parts suspended from a first carrier to being suspended from a second carrier. The carcass parts may be a half carcass, e.g. from pig, that may have been eviscerated and cleaned. The first carrier may be an industry standard gambrel having two opposed carrier ends pointing away from each other and being tied together with a cross bar or a single carrier, for example a Euro Carrier. The second carrier may be a single carrier, for example a Euro Hook. With this system and method, it can be realised to transfer two carcass parts suspended from a gambrel to two single carriers that are either part of the same deboning line or where each single carrier is part of separate deboning lines. Similarly, a transfer of a carcass part from one single carrier to another single carrier may be realized, for example for classifying purposes or diversion to a cooling facility away from the current processing line.

Embodiments of the invention preferably seek to mitigate, alleviate or eliminate one or more of the above-mentioned disadvantages singly or in any combination. In particular, it may be seen as an object of embodiments of the present invention to provide an overhang rail system that solves the above-mentioned problems, or other problems, of the prior art.

To address one or more of these concerns, in a first aspect of the invention an overhang rail transport system is provided, comprising:
a first processing section comprising multiple spaced apart first carriers for conveying carcass parts of a four-legged slaughter animal, where each of the first carriers comprises a free end for extending through an opening in a leg part of one of the carcass parts causing the carcass parts to be at least freely hanging,
at least one second processing section comprising multiple spaced apart second carriers where each of the second carriers comprises a free end for engaging with the leg part of one of the carcass parts causing the carcass part to be at least freely hanging,
wherein the overhang rail transport system further comprises:
a transfer zone positioned between the first processing section and the at least one second processing section,
a control device for automatically controlling the movement of the first and the second carriers so that upon arrival at the transfer zone the first and the second carriers are synchronized in movement such that:
a first carrier amongst the first carriers moves in a first direction carrying the carcass part through the opening in the leg part and at least one empty second carrier moving in a second direction meet with their respective free ends facing each other, the transfer zone being arranged such that during movement of the first and the second carriers:
the relative horizontal distance between the free end of the first carrier and the free end of the second carrier decreases, the second carrier engages with the carcass part, followed by the weight of the carcass part load being transferred from the first carrier to the second carrier, such as transferred directly from the first carrier to the second carrier.

A possible advantage of the invention may be that an efficient system is realized due to the movement during transfer and the processing section comprising the second carriers which renders it superfluous to carry out a subsequent transfer from the second carriers to subsequent carriers comprised within a subsequent processing section.

According to an alternative first aspect, an overhang rail transport system is provided comprising a first processing section having multiple spaced apart first carriers for conveying carcass parts of a four legged slaughter animal, where each of the first carriers has a free end designed to extend through an opening in a leg part of the carcass parts causing the carcass parts to be at least freely hanging, and at least one second processing section having multiple spaced apart second carriers, such as second spaced apart carriers for conveying carcass parts of a four legged animal, where each of the second carriers has a free end designed to engage with the leg part of the carcass parts causing the carcass part to be at least freely hanging.

The overhang rail transport system may further have a transfer zone positioned between the first processing section and the at least one second processing section, a control device for automatically controlling the movement of the first and the second carriers so that upon arrival at the transfer zone the first and the second carriers are synchronized in movement such that the first carrier moves in a first direction carrying a carcass part through an opening arranged in the leg part and at least one empty second carrier moving in a second direction meet with their respective free ends facing each other. The transfer zone is in one embodiment designed such that during movement of the first and the second carriers:

the relative horizontal distance between the free end of the first carrier and the free end of the second carrier decreases until the second carrier engages with the carcass part, followed by the weight of the carcass part load being transferred from the first carrier to the second carrier.

The at least one second processing section may include a second processing section comprising second type of carriers, a third processing section comprising third type of carriers etc., where each processing section may have different processing steps, e.g. one may be a first type of deboning line, another one may be a second type of deboning line, the third may be a cooling section acting as a buffer etc.

By 'transfer zone' may be understood a portion or area of the overhang rail transport system where the transfer takes place, such as where only transfer takes place. The transfer zone may be a portion or area extending throughout a zone where the first and second carriers are within a distance of each other comparable to the size of a carcass part, such as 1 m, such as 0.5 m, such as 0.1 m. The transfer zone may be a portion or area where a carcass part is neither supported fully by the first carrier nor the second carrier. It may be understood that the extent of the transfer zone may be determined by the structure of the overhang rail transport system, such as the shape and positions of rail guides and/or guiding devices, which may be advantageous for knowing where the transfer takes place.

By 'processing section' may be understood a section where one or more processing steps take place, such as any one of deboning, deskinning, cooling, buffering and classification, such as any one of deboning, deskinning, cooling, and classification. It may be understood that said processing takes place when the carcass parts are placed on the first, respectively, second carriers. For example, in the first processing section, a corresponding first processing step takes place while the carcass parts are on the first carrier, and in the second processing section, a corresponding second processing step takes place while the carcass part(s) is (are) on the second carrier(s).

In one embodiment, each processing section is associated with one or more processing steps, such as any one of deboning, deskinning, cooling, buffering and classification, such as any one of deboning, deskinning, cooling, and classification. A possible advantage of this may be that an efficient total processing may be realized, since a first processing step can take place on the first carrier followed by a direct transfer to the second carrier where the second processing step can take place.

It may be understood that a processing step may be carried out a workstation, such as wherein the workstation is an area dedicated for carrying out a specific processing step, e.g., with means for deboning, deskinning, cooling or classification. In an embodiment, the first carrier and the second carrier may each be arranged in an overhanging rail, where the rail of each overhanging rail is arranged so that conveying of a carcass in the first carrier or the second carrier along the respective rail takes a carcass to one or more workstations whereupon a processing step on the carcass can be carried out.

In one embodiment, an overhang rail transport system is provided wherein in the first processing section, a first processing step takes place (such as any one of deboning, deskinning, cooling, and classification) while the carcass part is on the first carrier, and in the second processing section, a second processing step (such as any one of deboning, deskinning, cooling, and classification) takes place while the carcass part is on the second carrier. A possible advantage of this may be that a transfer from the first carrier whereupon a processing step takes place directly onto the second carrier wherein a processing step takes places is effectuated, such as dispensing with a need for an intermediate transfer step and/or an intermediate transfer device.

In one embodiment, the transfer zone is arranged such that during movement of the first and the second carriers:

the relative horizontal distance between the free end of the first carrier and the free end of the second carrier decreases and subsequently, the relative horizontal distance between the free end of the first carrier and the free end of the second carrier increases before the second carrier engages with the carcass part.

In one embodiment, the transfer zone is further designed so that upon arrival at the transfer zone a height level of the free end of the second carrier is below a height level of a portion of the first carrier upon which the carcass part is resting such that the movement of the first and the second carriers causes the free end of the second carrier to penetrate into the opening at the leg part below the portion of the first carrier upon which the carcass part is resting.

In one alternative embodiment, the transfer zone is further designed so that upon arrival at the transfer zone the height level of the free end of the second carrier is below a height level of the free end of the first carrier such that the decrease in the relative position of the free ends causes the free end of the second carrier to penetrate into the opening at the leg part below the free end of the first carrier. Thus, a simple solution is provided to allow the first and the second carriers to engage with the carcass part via the opening in the leg part. The largest diameter or the height of the opening may vary but is commonly a few centimeters. The difference in the height level is selected such that it is within the height of the opening.

In another embodiment, the transfer zone is further designed so the relative height level distance between the portion of the first carrier upon which the carcass part is resting and a portion of the second carrier suitable for carrying the carcass part changes until the height level of the portion of the second carrier suitable for carrying the carcass part is above the height level of the portion of the first carrier upon which the carcass part was resting causing the weight transfer of the carcass part load to the second carrier.

In another alternative embodiment, the transfer zone is further designed so the relative height level distance between the free end of the first carrier and the free end of the second carrier changes until the height level of the free end of the second carrier is above the height level of the first carrier causing the weight transfer of the carcass part load to the second carrier.

In one embodiment, the overhang rail system further may have a guiding device, subsequent to the transfer of the carcass part to the second carrier, to guide the first carrier and/or the carcass part away from the second carrier resulting in that the second carrier becomes the sole carrier for the carcass part.

Further, the guiding device may have an elongated guiding member arranged relative to the first and second carriers such that the elongated guiding member, e.g. a rod or similar, interacts with the first carrier and/or the carcass part while the first carrier moves in the first direction, the interaction forcing an increase in the relative horizontal distance between the first carrier and the second carrier until a complete separation of the first carrier from the opening in the leg part.

The first carrier may be slideably attached to a first rail guide and the second carrier may be slideably attached to a second rail guide, where the transfer zone is defined via the arrangement of the first and/or the second rail guide causing the change in the relative horizontal distance between the free end of the first carrier and of the free end of the second carrier, and causing the change in the relative height level distance between the free end of the first carrier and the free end of the second carrier.

The transfer zone may be further defined via the internal arrangement of the height level distance between first and/or the second rail guide causing the change in the relative height level distance between the first carrier and the second carrier.

The first carrier may be a gambrel like structure comprising free ends at its opposite ends, where each of the opposite ends carries a carcass part, where the at least one second processing section includes two second processing sections, where the synchronized movement occurs at the opposite ends of the gambrel where empty free ends of second carriers penetrate, e.g. simultaneously, into the respective opening at the leg parts of the carcass parts. Thus, it is now possible to automatically transfer the carcass parts, which may be half carcasses, automatically to the second carriers associated with a second and third processing sections without any manual labour, where the processing steps at the second and third processing sections may include, but is not limited to, be cooling (temporal storage as an example), at least partly deboning of the carcass part by e.g. manual labour and/or processing devices.

The carcass part may initially be transferred from one side of the gambrel while the other side of the gambrel is temporarily supported by the second carrier. It is thus prevented that the gambrel tilts when one carcass part on one side is removed prior to the removal of the carcass part on the opposite site of the gambrel and thus a tilting of the gambrel is prevented.

In one embodiment, the overhang rail transport system further comprises guide arrangements comprising multiple of guides configured to stabilize and raise the gambrel during the movement of the gambrel. In an embodiment, the guide arrangement comprises first bottom guide, generally shaped to follow a bottom contour of the gambrel, utilized for either stabilizing the gambrel from movement in a rotating direction about a conveying device to which the gambrel is slideably attached to and/or to raise the gambrel free ends in a vertical direction. In another embodiment, guide arrangement further a first top guide, may be used to stabilize the gambrel from movement in a rotating direction about the gambrel conveying device. Similarly, a second top guide may be provided configured to be used to stabilize the gambrel from movement in a rotating direction about the gambrel conveying device. Bottom guides may further be provided designed to have a profile in the travel direction of the gambrel. For example, the guide profile may be lower at an entrance portion of the guides and gradually be raised to a higher profile to push the gambrel upwards by tilting the gambrel backwards and upwards towards the gambrel conveying device. In this way, the vertical position of the free ends of the gambrel may be varied with respect to the conveying device depending upon where the gambrel is situated along the profile of the guides.

The first carrier may comprise a single hook, more specifically a Euro Hook. The single hook may comply with DIN 5047. In a further embodiment, the first carrier may be identical to the second carrier.

In one embodiment, the second carrier, such as the multiple second carriers each, comprises a hook, such as a Euro Hook.

Accordingly, an overhang rail system is provided that is capable of fully automatically performing a re-shackling of a carcass part from the first shackle type to the at least one second shackle type without any manual labour. The term carcass part may according to the present invention be understood as, but not limited to, a half pig. Moreover, this facilitates deboning and other processes since e.g. such a half pig can weigh well over 40 kg, compared to having carcasses lying on horizontal transport conveyors. Moreover, the overall yield of the deboning may be increased significantly since e.g. no sawing operation is needed. Thus, as an example, the removal of the ribs e.g. in case the carcass part is half a pig, may be done manually so that the resulting ribs may contain the overall ribs from rib number 4 and onwards, i.e. a larger rib part, instead of where commonly, the removal of the ribs requires a sawing operations where from e.g. ribs number 5/6 throughout ribs 7-9 (as an example), which leaves sharp rib edges at the end of the ribs, and saw dust, which makes the resulting rib product less attractive towards customers and thus less valuable. Another example of an advantage of now being able to process (e.g. debone) such a half carcass is that the complete loin may be removed from the carcass part, but today, commonly, the middle part of the half carcass is removed via sawing operation from the leg part leaving a part of the loin in the leg part which is less valuable than the loin.

Further, such an automatic transfer of a carcass part from one carrier, belonging to one processing section, to another carrier, belonging to a second processing section, may be affected fully automatically which increases enormously the variety of the processing steps.

In one embodiment, the transfer zone further comprises a support guide such as a tapered guide to interact with a rear side of the first and/or the second shackle type while the second carrier engages with the carcass part and/or while the carcass part is removed from the first shackle and to the second shackle. This may e.g. be of relevance when the shackles are mounted to a rail system in a hinge like manner, thus, such support guide will prevent the shackle from swinging during the transfer of the carcass part.

In one embodiment, the transfer zone is arranged such that subsequent to said movement of the first and the second carriers:
a horizontal position of a portion of the first carrier upon which the carcass part is resting, is substantially identical, such as identical to, a horizontal position of a portion, such as a bottom part of the second carrier suitable for carrying the carcass part. This may be beneficial for facilitating a transfer, such as a direct transfer, from a first carrier to a second carrier. For example, this embodiment may partially or fully ensure that a center of gravity of the carcass part initially supported by the first carrier can be supported by the second carrier subsequent to a transfer of the carcass part to the second carrier without rotation and/or horizontal displacement of the carcass part relative to the first carrier and/or the second carrier.

In one embodiment, the first carrier is slideably attached to a first rail guide, such as a first overhanging rail guide, and the second carrier is slideably attached to a second rail guide, such as a second overhanging rail guide. A possible advantage of this may be that the rail guides facilitate effective and/or controlled transfer of the carcass part to and from the transfer zone. Another possible advantage may be that the rail guides, such as the shapes of the rail guides, may contribute to and/or be responsible for effectively controlling the relative positions of the first and second carriers during the transfer and hence contribute to and/or be responsible for a simple, yet effective and safe, transfer.

In one embodiment, the multiple first carriers are slideably attached to a (single) first rail guide, such as a first overhanging rail guide, and the second multiple carriers are slideably attached to a (single) second rail guide, such as a second overhanging rail guide. It may be advantageous to have multiple carriers attached to the same rail guide, since then the rail guide can be utilized for the multiple carriers and/or the shape of the rail guide can serve to control the path of the multiple carriers.

In one embodiment, each of the multiple first carriers travel along the same path as other first carriers when being conveyed along the first rail guide and wherein each of the multiple second carriers travels along the same path as other second carriers when being conveyed along the second rail guide. An advantage of this may be that the controller needs merely control the speed and/or synchronize the movement of conveying to control the position of the carriers (because the path is predetermined via the structure of the rail guide and optionally by guiding devices along the rail guide). This may be beneficial for facilitating a simple, yet effective and safe, transfer, because it enables realizing the transfer where merely speed of conveying or the synchronization of movement of the first and second carriers needs to be controlled to make the carriers meet at the transfer zone and have the transfer carried out. For example, the paths of the first carrier and the second carrier can be predetermined via the structure of the overhang rail transport system, such as first and second rail guides and optionally guiding devices, so that paths of the first and second carriers enable them to meet in the transfer zone and if their movement is synchronized appropriately a transfer will automatically be effectuated.

In one embodiment, the direction of movement of each of the first carrier and the second carrier is determined by the structure of the overhang rail system, such as by shapes of rails and/or by guiding devices. This may be beneficial for facilitating a simple, yet effective and safe, transfer.

In one embodiment, the control device is arranged for adjusting the speed of a second carrier conveyor to align a tip of the single carrier to coincide with a location of the opening in the leg part of the carcass part. A possible advantage of this may be, that once the tip is aligned with the location of the opening in the leg part of the carcass part, the engagement of the free end of the second carrier with the carcass part can be realized by a horizontal movement of the second carrier relative to the first carrier, which may be realized, e.g., by the structure of a first and/or second rail guide (determining the relative path of the first and second carriers) and/or guiding devices (e.g., a guiding device causing the second carrier to swivel around an axis parallel to a conveying direction, which in turn causes the free end of the second carrier to engage with the carcass part).

In one embodiment, the control device (60) is arranged for automatically controlling the movement of the first and the second carriers so that, at a point or period in time, where the weight of the carcass part load being transferred from the first carrier to the second carrier, the horizontal component of the movement of the first carrier is non-zero, and the horizontal component of the movement of the second carrier is non-zero. By 'the horizontal component of the movement' is understood a two-dimensional vector confined to lie in a horizontal plane (such as the projection of a three-dimensional velocity vector onto a horizontal plane). By 'non-zero' may be understood, at least 1 mm/hour, such as at least 1 m/hour, such as at least 1 km/hour. An advantage may be that both carriers are moving, and no time is spent stopping-and-starting any of the first and second carriers. The transfer may be fitted into a flow of the carriers, which may be particularly beneficial if the movement of multiple (first or second) carriers is tied to each other, which may for example be the case in a closed loop rail system.

In one embodiment, the control device (60) is arranged for automatically controlling the movement of the first and the second carriers so that, at a point or period in time, where the weight of the carcass part load being transferred from the first carrier to the second carrier, the horizontal component of the movement of the first carrier is substantially identical, such as identical, to the horizontal component of the movement of the second carrier. A possible advantage is that the transfer can take place at a point or period in time, where the relative positions of the first and second carriers are substantially identical or identical.

In one embodiment, the control device (60) is arranged for automatically controlling the movement of the first and the second carriers so that, at a point or period in time, where the weight of the carcass part load being transferred from the first carrier to the second carrier, the horizontal component of the movement of the first carrier is non-zero and substantially identical, such as identical to the horizontal component of the movement of the second carrier. A possible advantage of this is that the transfer can take place at a point or period in time, where the relative positions of the first and second carriers are substantially identical or identical and that both carriers are moving, and no time is spent stopping-and-starting any of the first and second carriers. The transfer may be fitted into a flow of the carriers, which may be particularly beneficial if the movement of multiple (first or second) carriers is tied to each other, which may for example be the case in a closed loop rail system.

In one embodiment, the control device incorporates a vision system for detecting the position of the individual opening (18) in the carcass part and wherein the control device uses this position information to regulate the movement of the first carrier and/or the second carrier, such as the movement of the second carrier relative to the first carrier.

According to a second aspect there is provided a method for transferring a carcass part (17) from a first carrier (15, 15') to a second carrier (40, 42) of an overhang rail transport system (1), which overhang rail transport system comprises: a first processing section (10) comprising multiple spaced apart first carriers (15, 15') for conveying carcass parts (17) of a four-legged slaughter animal, where each of the first carriers comprises a free end (22, 41') for extending through an opening in a leg part of one of the carcass parts causing the carcass parts to be at least freely hanging,
at least one second processing section (12) comprising multiple spaced apart second carriers (40, 42) where each of the second carriers comprises a free end (41, 43) for engaging with the leg part of one of the carcass parts causing the carcass part to be at least freely hanging,
a transfer zone (22) positioned between the first processing section and the at least one second processing section,
wherein the method comprises:
automatically controlling the movement of the first and the second carriers so that upon arrival at the transfer zone the first and the second carriers are synchronized in movement such that a first carrier amongst the first carriers moves in a first direction (16) carrying the carcass part through the opening in the leg part and at least one empty second carrier moving in a second direction (26) meet with their respective free ends (22, 41) facing each other, the transfer zone being arranged such that during movement of the first and the second carriers the relative horizontal distance between the free end of the first carrier and the free end of the second carrier decreases and the second carrier engages with the carcass part, followed by the weight of the carcass part load being transferred from the first carrier to the second carrier.

According to an alternative second aspect there is provided a method is provided for transferring a carcass part from a first carrier to a second carrier of an overhang rail transport system, which overhang rail transport system comprises:
a first processing section comprising multiple of spaced apart first carriers for conveying carcass parts of a four-legged slaughter animal, where each of the first carriers comprises a free end designed to extend through an opening in a leg part of one of the carcass parts causing the carcass parts to be at least freely hanging,
at least one second processing section comprising multiple spaced apart second carriers where each of the second carriers comprises a free end designed to engage with the leg part of one of the carcass parts causing the carcass part to be at least freely hanging,
a transfer zone positioned between the first processing section and the at least one second processing section,
wherein the method comprises:
automatically controlling the movement of the first and the second carriers so that upon arrival at the transfer zone the first and the second carriers are synchronized in movement such that the first carrier moves in a first direction carrying the carcass part through the opening in the leg part and at least one empty second carrier moving in a second direction meet with their respective free ends facing each other, the transfer zone being designed such that during movement of the first and the second carriers the relative horizontal distance between the free end of the first carrier and the free end of the second carrier decreases until the second carrier engages with the carcass part, followed by
the weight of the carcass part load being transferred from the first carrier to the second carrier.

The first direction and the second direction may in one embodiment be parallel directions where the shackles are moving in the same directions. In another embodiment, the shackles are moving in an angular direction relative to each other, e.g. with a 90 degrees angle.

In one embodiment, the second carrier is arranged to grip around a foot of the leg of the carcass part, where the second carrier comprises two free ends being more or less parallel, where the gripping around the food may include clamping the leg of the carcass part between these two free ends.

In one embodiment, the free end of each of the second carriers is configured to extend through an opening in the leg part of the carcass parts causing the carcass part to be at least freely hanging.

In one embodiment, the method comprises designing the transfer zone so that upon arrival at the transfer zone the height level of the free end of the second carrier is below a height level of the free end of the first carrier such that the decrease in the relative position of the free ends causes the free end of the second carrier to penetrate into the opening at the leg part below the free end of the first carrier.

In one embodiment, the method comprises further designing the transfer zone so the relative height level distance between the free end of the first carrier and the free end of the second carrier changes until the height level of the free end of the second carrier is above the height level of the first carrier causing the weight transfer of the carcass part load to the second carrier.

In one embodiment, the method further comprises the step of guiding the first carrier away from the second carrier using a guiding device, subsequent to the transfer of the carcass part to the second carrier, resulting in that the second carrier is the sole carrier for the carcass part.

In one embodiment, the method further comprises the step of increasing the relative horizontal distance between the first carrier and the second carrier until a complete separation of the first carrier from the opening in the leg part by interacting the guiding device in the shape of an elongated guiding member arranged relative to the first and second carriers such that the elongated guiding member interacts with the first carrier and/or the carcass part while the first carrier moves in the first direction, the interaction forcing an increase in the relative horizontal distance between the first carrier and the second carrier until a complete separation of the first carrier from the opening in the leg part.

In one embodiment, the method further comprises the step of using a gambrel like structure comprising free ends at its opposite ends as the first carrier, where each of the opposite ends carries a carcass part, wherein the at least one second processing section includes two second processing sections, wherein the synchronized movement occurs at the opposite ends of the gambrel where empty free ends of second carriers penetrate into the respective opening at the leg parts of the carcass parts.

In one embodiment, the step of transferring comprises transferring the carcass part from one side of the gambrel while the other side of the gambrel is temporarily supported by the second carrier.

In one embodiment, the first and the second carriers are identical.

Accordingly, a method is provided that among other things allows full automatization of re-shackling, e.g. from a gambrel to hooks while the carcass parts, e.g. half pig carcasses, are still hanging from an overhead position. This makes the subsequent processing much easier for an operator, e.g. deboning, trimming, compared to having carcasses lying on horizontal transport conveyors. Further, an automatic transfer of a carcass part from one carrier, belonging to one processing line, to another carrier, belonging to a second processing line, may be affected.

BRIEF DESCRIPTION OF THE DRAWINGS

Embodiments of the invention will be described, by way of example only, with reference to the drawings, in which

FIG. 1b is a schematic end view of the embodiment of FIG. 1a;

FIG. 1c is a schematic side view showing an embodiment of the invention;

FIG. 4a-f are schematic side views showing detailed steps of a gambrel to single carrier transfer according to a further embodiment of the invention;

FIG. 5a-d are schematic side views showing detailed steps of a single carrier to single carrier transfer according to an embodiment of the invention;

FIG. 6a-d are schematic end views showing the relative position of the bottom of the initial carrier (circle) to the tip of the carrier to transfer the load to (circle with black dot);

FIG. 9 is a schematic top view showing embodiments of height adjustment guides for the overhead transport system according to the invention;

FIG. 10 is a schematic side view showing a further embodiment of height adjustment for an overhead trolley system according to the invention.

DESCRIPTION OF EMBODIMENTS

Figure 1A:
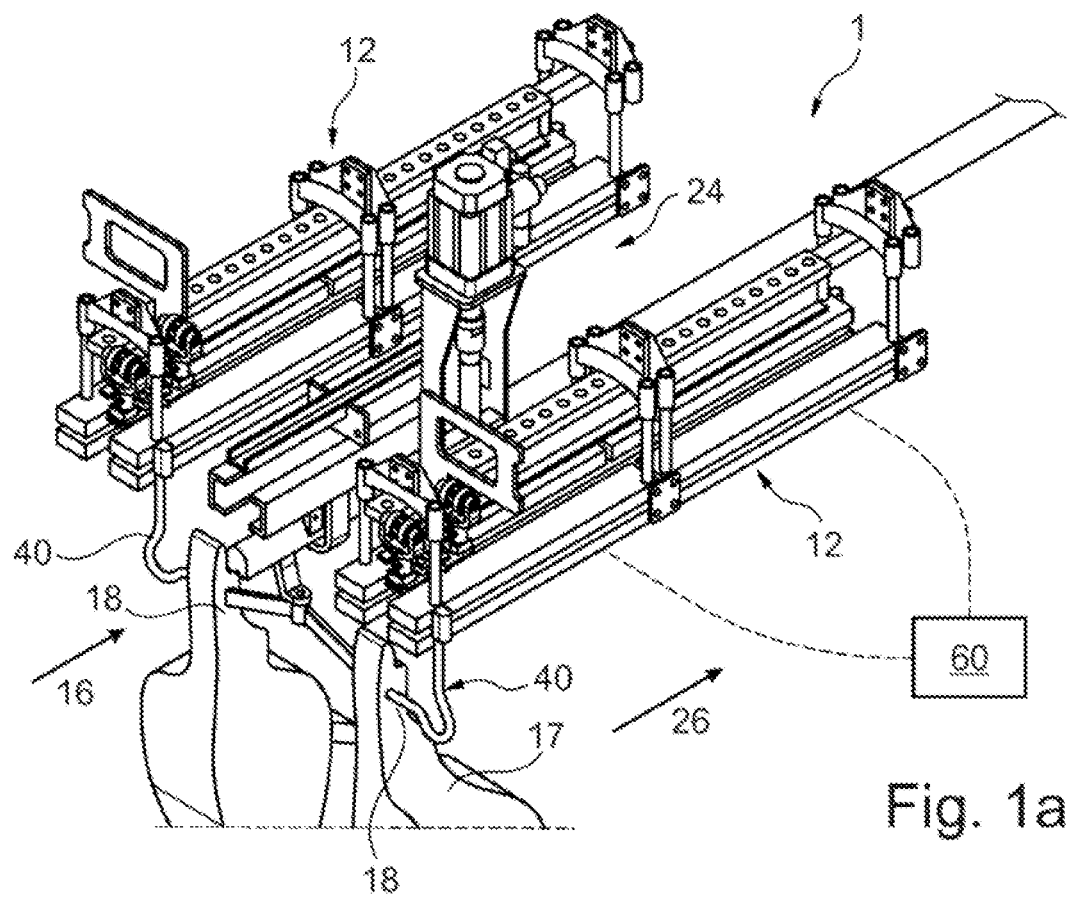
FIG. 1a is a schematic perspective view showing a gambrel to single carrier transfer system according to an embodiment of the invention.

Referring to FIGS. 1a to 1d, an embodiment of an overhang rail transport system 1 according to the present invention for transferring carcass parts 17 from a gambrel conveyor 10 to a single carrier transport line 12 is shown. The gambrel conveyor and the single carrier transport line are mounted to a frame 20. The carcass parts enter a transfer zone 24 hanging one from each free end 22 (see FIG. 2a, for details) of an individual gambrel (first carrier) 15. The carcass parts may be one right side and one left side of a slaughter animal that has been eviscerated and halved along the spine. Alternatively, the front end of the carcass part, or other carcass parts, may be removed before the gambrel transport line enters the transfer zone. One carcass part is hanging from an opening 18 arranged in a rear leg of the slaughter animal, one of the carrier ends 22 of the gambrel 15 penetrating the opening to thereby let the carcass part hang from the gambrel. The animal head may still be attached to one of the right or left sides of the slaughter animal.

Figure 1B:
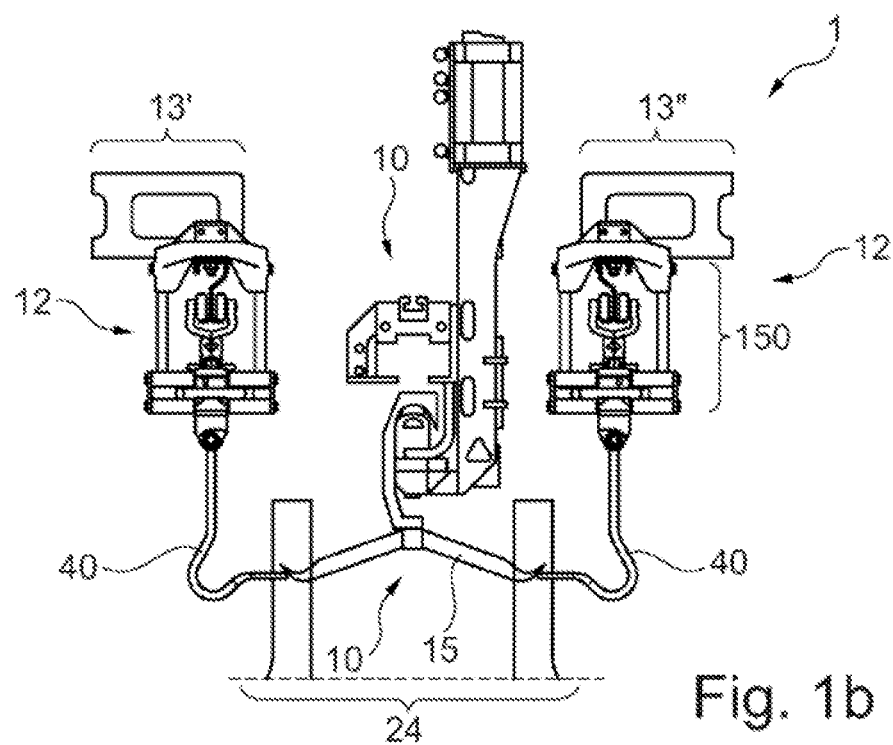
Figure 1D:
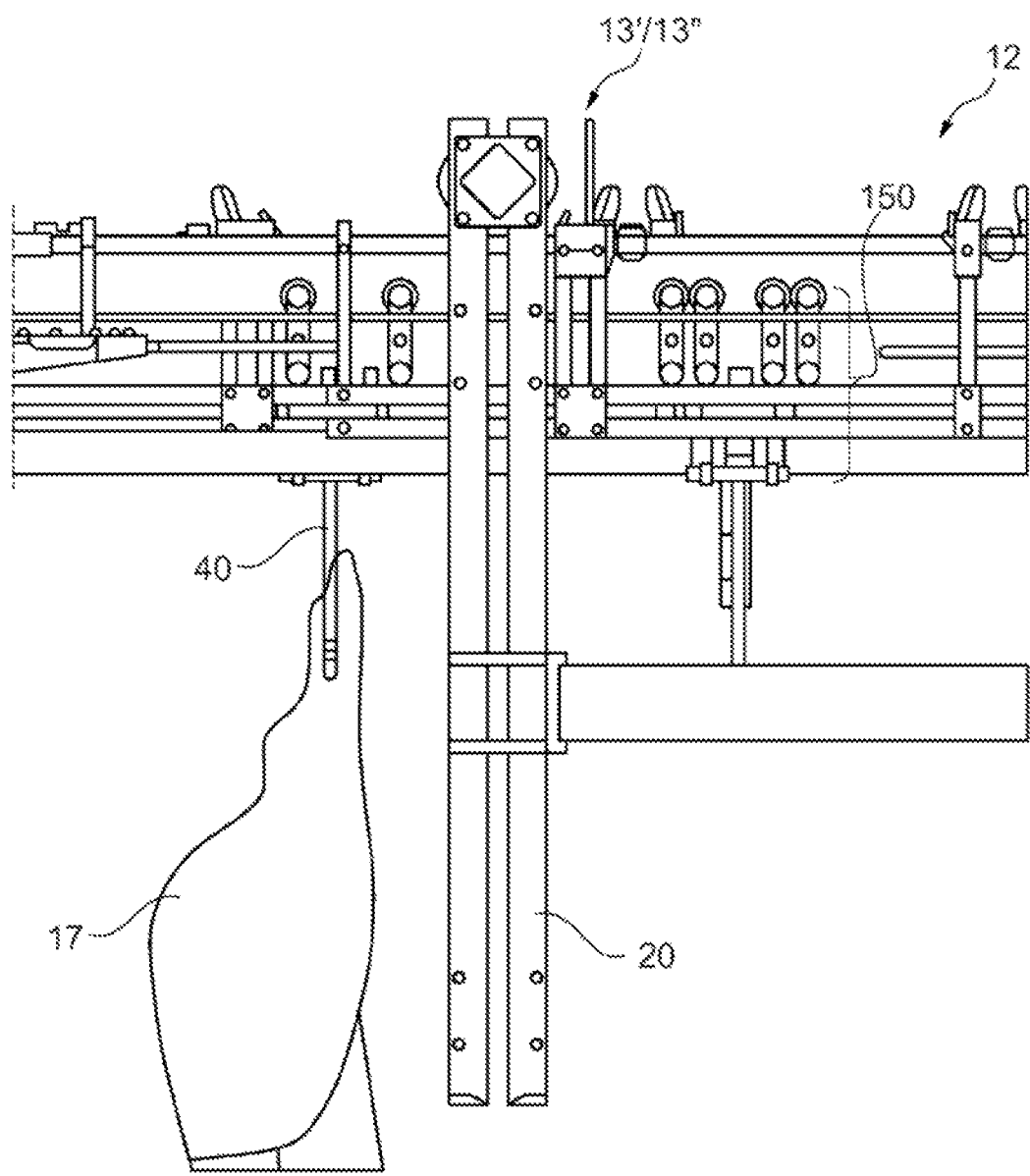
FIG. 1d is a schematic side view showing a single hook conveyor according to an embodiment of the invention.

The carcass parts on the gambrel conveyor 10 are transported in the direction marked 16 in FIG. 1a and pass in-between two single carrier conveyors, one marked 13', shown on the left side of FIG. 1b, and the other marked 13", shown on the right side of FIG. 1b. The single carrier conveyors are travelling in a direction marked 26. In the transfer zone 24, direction 16 is parallel to direction 26, and both are heading the same way. The carriers (second carrier) 40 used on each single carrier conveyor may be a standard Euro hook or a modified Euro hook 40 (for details see FIGS. 2b to 2h). The single carriers are mounted to the single hook conveyors 13', 13" using a trolley arrangement 150 that allows the single carriers to at least swivel in a direction transverse to the travelling direction 26. The transport system for the gambrel conveyor 10 as well as the single carrier conveyors 13', 13" may be of a known type and will not be described in detail except when changes have been made to the already known types of transport system.

The individual transport speeds of the respective conveyors 10, 13', and 13" may be set using a control system 60, which may be electrically connected to other systems (not shown) up-stream or down-stream of the transfer system 1. The control system may adjust the speed of the single carrier conveyor 13' to align the tip 41 of the single carrier 40 of this "left" single carrier conveyor to coincide with the location of the opening 18 arranged in the rear leg of the carcass part shown on the left side of FIG. 1b. Simultaneously, the control system may adjust the speed of the single carrier conveyor 13" to align the tip 41 of the single carrier 40 of this "right" single carrier conveyor to coincide with the location of the opening 18 arranged in the rear leg of the carcass part shown on the right side of FIG. 1b. The speed adjustments may be in the form of a retardation of one conveyor or an acceleration of one conveyor whilst keeping the speed of another conveyor constant, or combinations of these actions.

Figure 2A:
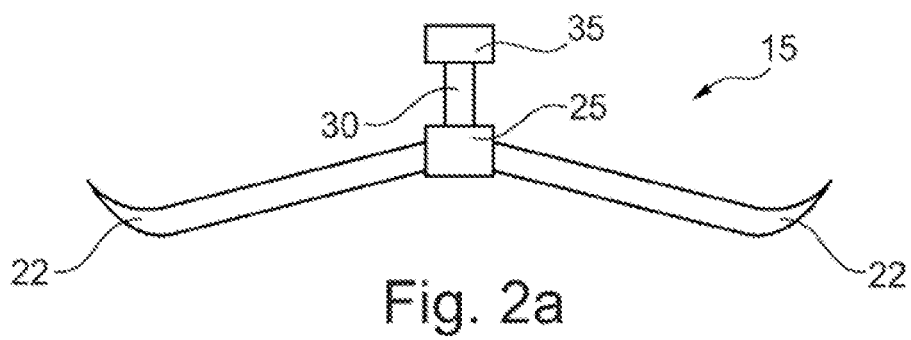
FIG. 2a is a schematic side view showing a gambrel carrier according to an embodiment of the invention.

An embodiment of a gambrel 15 that may be used in the transfer system 1 is shown in FIG. 2a. The gambrel is adapted to convey carcass parts 17, where each of the gambrels may have a free end 22 designed to extend through the opening 18 in the leg part of the carcass part causing the carcass part to be at least freely hanging. The gambrel 15 has a middle junction 25 that is attached to a conveying device 35 using an extension 30. The gambrel may be a standard type, as has been mentioned earlier.

Figure 2B:
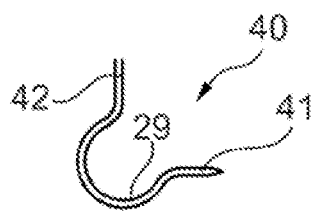
FIG. 2b is a schematic side view showing a modified Euro carrier according to an embodiment of the invention.
Figure 2C:
FIG. 2c is a schematic side view showing a further embodiment of a modified Euro carrier according to the invention.

FIGS. 2b to 2h show embodiments of single carriers 40 that may be used in the transfer system 1. The carrier may be comparable to a standard Euro hook and may use the same conveyor system as a Euro hook but has an elongated and substantially horizontally extended tip 41. The tip may be longer (FIG. 2b) or shorter (FIG. 2c). A bottom part 29 of the carrier 40 is intended for the leg part of the carcass part to be resting in, such that the weight of the carcass part is substantially hanging right under a stem 42 of the carrier. The stem is connected to a conveyor propulsion connection part of the carrier that is not shown in the figures.

Figure 2E:
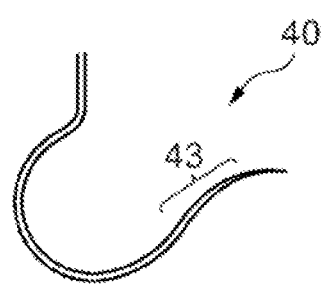
FIG. 2e is a schematic side view showing another embodiment of a modified Euro carrier according to the invention.
Figure 2F:
FIG. 2f is a schematic side view showing yet another embodiment of a modified Euro carrier according to the invention.

FIGS. 2e and 2f show further embodiments of single carriers 40 that may be used in the transfer system 1. The transition 43 from the curved carrier portion to the tip is gentler (smaller radius bend) and the tip itself is pointing upwards at an angle of, for example, 20 to 45 degrees compared to the carriers shown in FIGS. 2b and 2c. The carrier shown in FIG. 2f has a substantially straight transition 44 from the curved carrier portion to the tip, and the tip may be long and angled upwards.

Figure 2D:
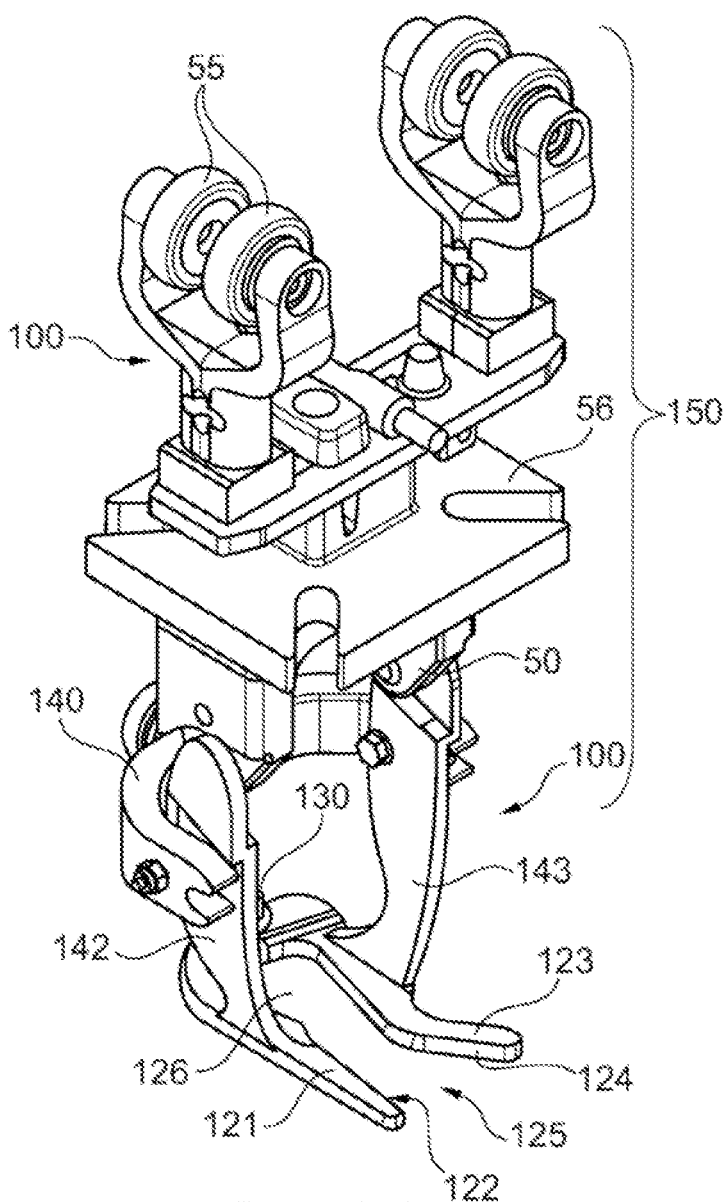
FIG. 2d is a schematic perspective view showing a flexible shackle used in an embodiment of the invention.
Figure 2G:
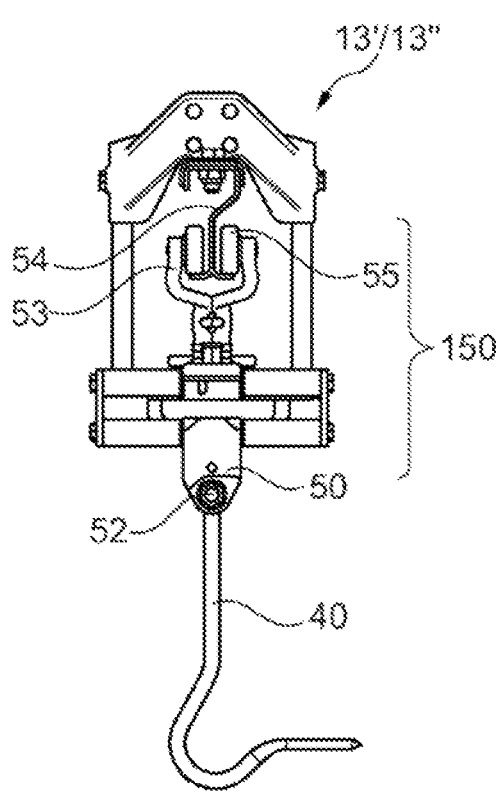
FIG. 2g is a schematic side view showing the modified Euro hook of FIG. 2b in its overhead conveyor arrangement according to one embodiment of the invention.
Figure 2H:
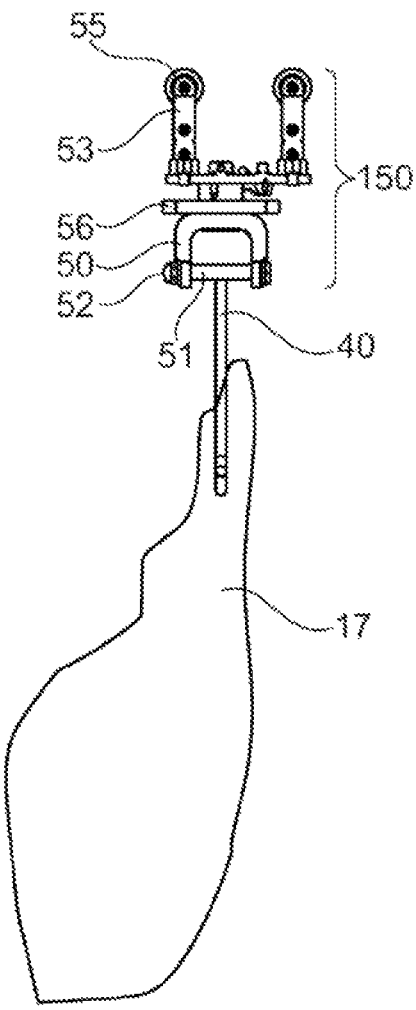
FIG. 2h is a schematic end view showing the trolley portion of the modified Euro hook of FIG. 2g.

FIGS. 2g and 2h show the carrier of FIG. 2b mounted on a trolley arrangement 150 attached to the single hook conveyor 13', 13". The carrier 40 is pivotably attached to a fork 50 via a crossbar 51. The crossbar is rotatably held in the fork via hinge points 52. The crossbar rotation is about a horizontal axis. The fork is rotatably attached to a trolley slide 53. The fork rotation is about a vertical axis. The trolley slide is slidable along a conveyor rail 54, for example using rotatable wheels 55 or similar. A cam 56 having shapes corresponding to cam drives (not shown) arranged along the single hook conveyor 13', 13" may impart the rotating motion to the fork 50 at desired locations along the conveyors.

Figure 2I:
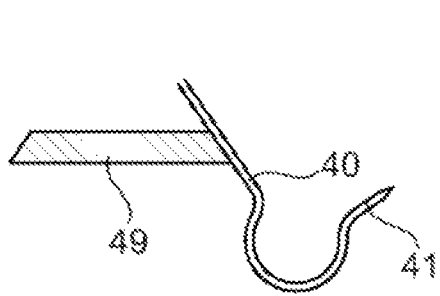
FIGS. 2i and 2j are schematic side views showing an embodiment of a modified Euro hook being angled in a plane perpendicular to the conveyor transport direction.
Figure 2J:
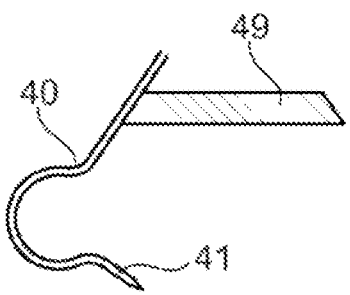

Embodiments of tilting the carrier 40 in a direction perpendicular to the single carrier conveyor transport direction 26 (see FIG. 1a) are shown in FIGS. 2i and 2j. The single carrier 40 is pivotable as has been disclosed in conjunction with FIGS. 2g and 2h above. The carrier is pivotably attached to the fork 50 via the crossbar 51. To effect a pivoting motion in the direction of the tip 41 (as shown in FIG. 2i), a tilting guide 49 cooperates with the stem 42 (see FIGS. 2b and 2c) of the carrier to angle the carrier to a desired angular position with respect to the cross-bar 51. In this way, the carcass may be raised (displaced in the vertical direction as shown in FIG. 2i) simultaneously as the horizontal position of the carcass changes. An example when this is desirable is when a carcass has to slide down from the tip 41 to the bottom part 29 of the carrier 40 after a transfer.

In another embodiment, to effect a pivoting motion in the direction away from the tip 41 (as shown in FIG. 2j), a tilting guide 49 cooperates with the stem 42 (see FIGS. 2b and 2c) of the carrier to angle the carrier to a desired angular position with respect to the cross-bar 51. In this way, the carcass may be raised (displaced in the vertical direction as shown in FIG. 2i) simultaneously as the horizontal position of the carcass changes. An example when this is desirable is when a carcass has to slide off the carrier 40 from the tip 41 to remove the carcass from the carrier. The tilting guide may be tapered to impart a gradual tilt to the carrier 40. The tilted position, in a desired angle, may be used to facilitate inserting the tip 41 into the opening of the carcass and/or removing the tip from the opening during a carcass transfer operation.

FIG. 2d shows a flexible slaughter animal carrier 100 intended to grip on the foot of a slaughtered pig. In an embodiment of the invention, a carcass part is transferred either from a single carrier to the flexible carrier or from a gambrel to a pair of flexible carriers. The transfer from one carrier to the other may be made using a guide (not shown) that tapers so that the carcass part is pressed from one carrier to the other carrier. If necessary, a support guide (not shown) may be arranged under the carcass part to temporarily relieve the load on the carrier during carcass part transfer. The flexible carrier shown here corresponds in details to the flexible carrier disclosed in WO2014007607 A1.

The carrier 100 has a first jaw element 121, which has an engagement face 122 and a second jaw element 123, which has an engagement face 124. In use, the carcass part 17 is clamped between the engagement faces 122, 124. The first and second jaw elements 121, 123, define a holding slot 125 between them. In use, a leg of a part will be arranged in the holding slot such that the carrier 100 can retain the carcass part. The holding slot 125 has a retaining part 126. The retaining part 126 is the part of the holding slot 125 in which the carcass part is actually retained in use, e.g. during transport of the carcass part along the track of an overhead conveyor. The engagement faces 122, 124 define opposite walls of the retaining part 126 of the holding slot 125. The first jaw element 121 and the second jaw element 123 are moveable relative to each other such that the width of the retaining part 126 of the holding slot 125 can be varied over a width range between a minimum width and a maximum width. So, it is possible that the jaw elements assume a relative position such that the width of the retaining part of the holding slot is somewhere between the minimum width and the maximum width. The first jaw element 121 and the second jaw element 123 are connected to each other by means of a hinge 130 with a hinge pin (not shown) such that the jaw elements may pivot relative to each other in order to vary the width of the retaining part 126 of the holding slot 125. The jaw elements 121, 123 may be jaw plates. The carrier 100 further comprises a tensioning structure in the form of an elastic bar 140. The elastic bar 140 extends between a first extension 142 of the first jaw element 121 and a second extension 143 of the second jaw element 123. The tensioning force of the elastic bar has the effect that a threshold force has to be overcome to move the first and/or second jaw element away from each other. This assists in reliable clamping of the carcass or carcass part in the holding slot of the carrier. The first extension 142 the second extension 143 are pivotably and rotatably connected to a trolley arrangement 150 that cooperates with the conveyor 10, 13' or 13". The trolley arrangement may be similar to what has been described earlier in conjunction with FIGS. 2g and 2h.

FIGS. 3a to 3e show the steps involved in de-gambreling carcass parts 17 from a gambrel 15 (first carrier) to a pair of single carriers 40 (second carrier). The gambrel and the single carriers have been described above for FIGS. 2a to 2c. The gambrel conveyor 10 passes in-between two single carrier conveyors (not shown but see description above for FIGS. 1a and 1b). The individual transport speeds of the respective conveyors may be set using a control system as described earlier. The free ends 22 of the gambrel are inserted in openings 18 (see FIG. 1a) in the legs of the carcass parts 17 so that the carcass parts hang freely from the gambrel free ends.

Figure 3A:
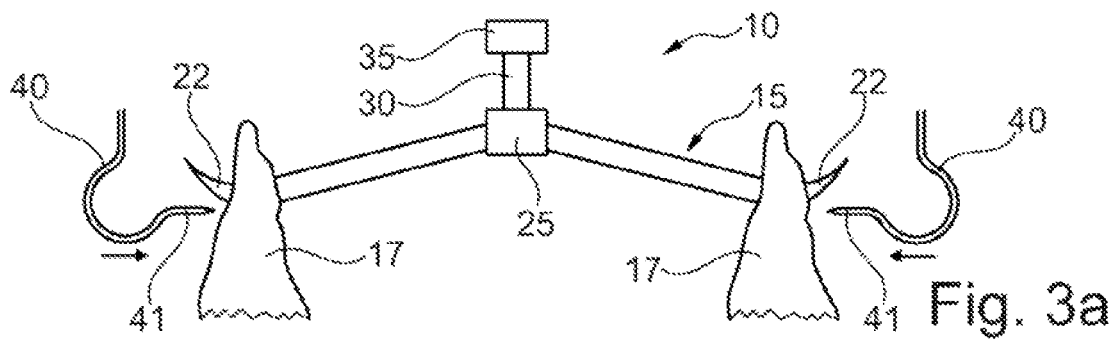
FIG. 3a-e are schematic side views showing detailed steps of a gambrel to single carrier transfer according to an embodiment of the invention.

FIG. 3a shows an initial step where the location of the free ends 22 of the gambrel 15 are lined up with the tip 41 of the single carrier 40 on either side of the gambrel. The lining up may take place by adjusting the speed of either the gambrel conveyor and/or either of the single carrier conveyors. The control system may incorporate a vision system (not shown) for detecting the position of the individual opening 18 in the carcass part. In this case, the control system uses this position information to regulate the conveyor speeds. The tip 41 of each single carrier 40 is pushed into the corresponding opening 18, for example using a tapered guide 70 (as shown in FIGS. 5b and 5c described below). The weight of the carcass part 17 is held solely by the free ends 22 of the gambrel 15 at this point. The vertical position of the tip 41 is lower than the vertical position of the free ends.

Figure 3B:
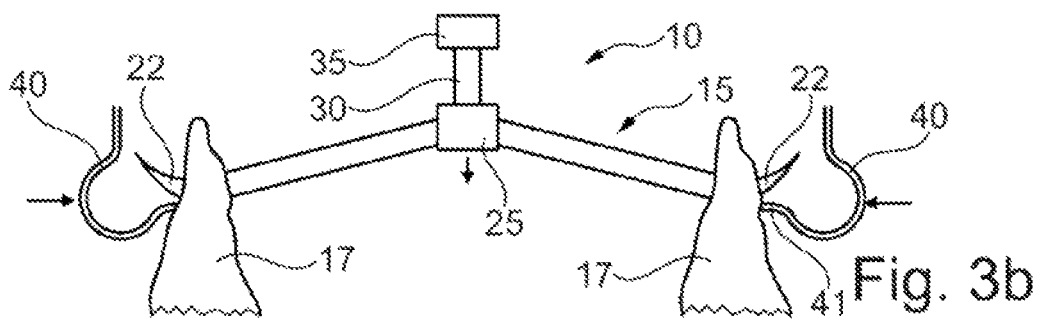
Figure 3C:
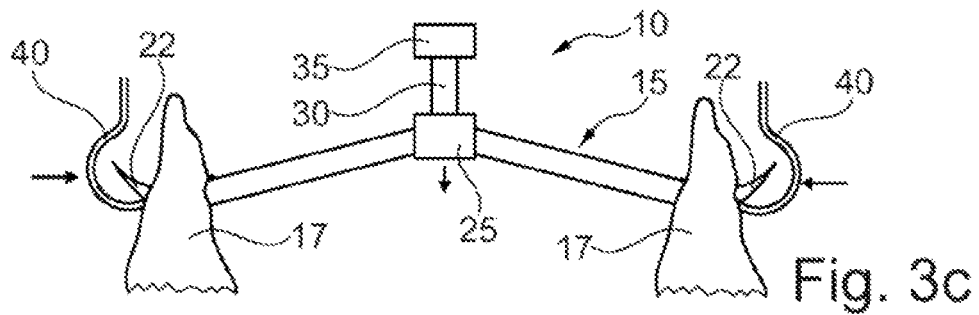
Figure 8A:
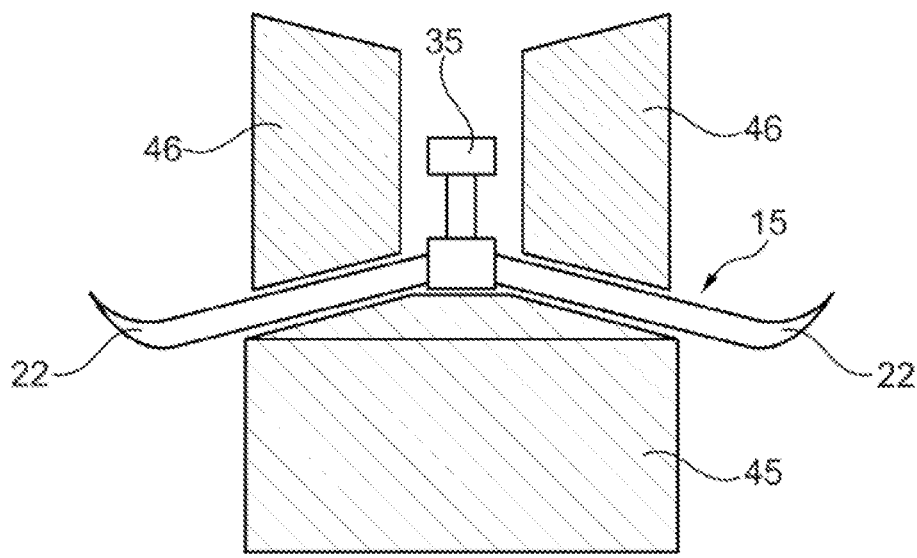
FIG. 8a is a schematic end view showing gambrel guides according to embodiments of the invention.
Figure 8B:
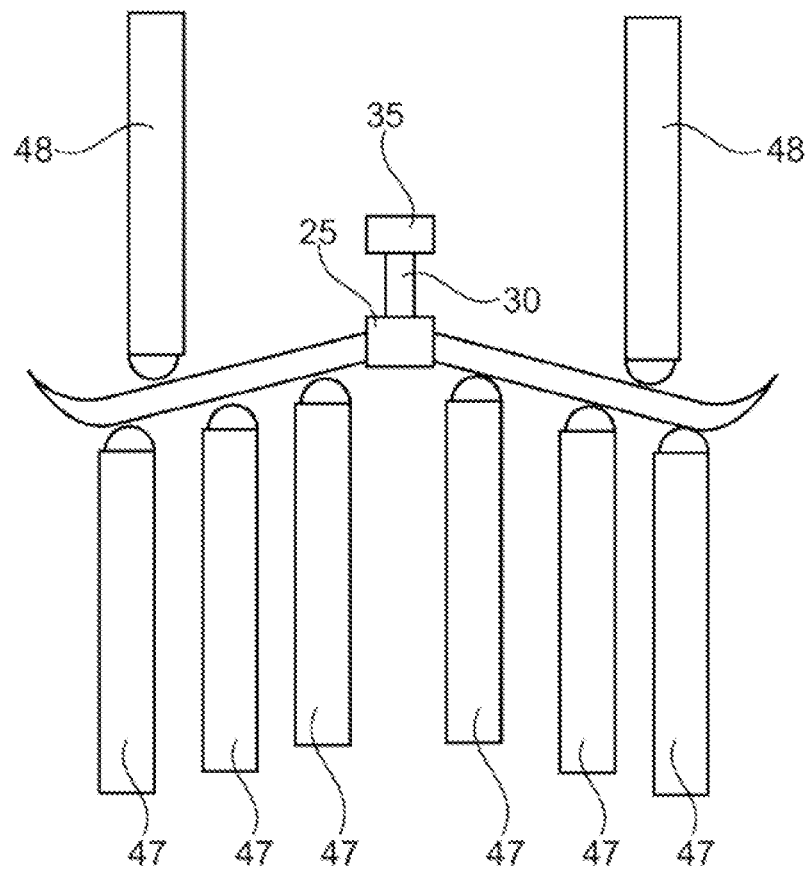
FIG. 8b is a schematic end view showing gambrel guides according to further embodiments of the invention.

In FIGS. 3b and 3c, the tip 41 of each single carrier 40 has penetrated into the respective opening 18. The vertical position of the free ends 22 is now lowered, with respect to the tips 41. This may be done by lowering the gambrel conveyor path or by utilizing guides 45, 46, 47 and/or 48 (as shown in FIGS. 8a and 8b and FIG. 9 described below). The guide lifts the gambrel up to a higher vertical position in preparation for the transfer operation and gradually lowers the gambrel when the tip 41 has been inserted into the opening 18. The guides also stabilize the gambrel from swinging movement in any plane.

Figure 3D:
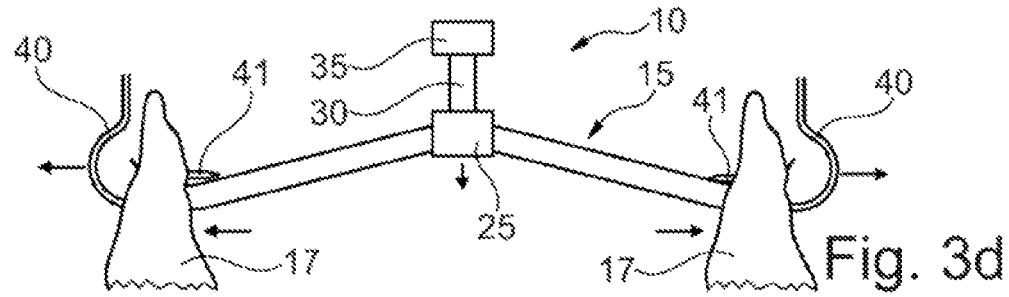

FIG. 3d shows a step where the tip 41 is fully inserted into the opening 18, the free ends 22 of the gambrel have been lowered so that the weight of the carcass part 17 fully rests on the individual single carriers 40 and the carcass parts and/or the single carriers are being displaced away from the free ends of the gambrel. This may be done by utilizing a tapered guide 70 (see FIGS. 5b and 5c described below) to push the carcass part away from the gambrel and/or by the single carrier conveyor paths diverging outwards with respect to the gambrel conveyor.

Figure 3E:
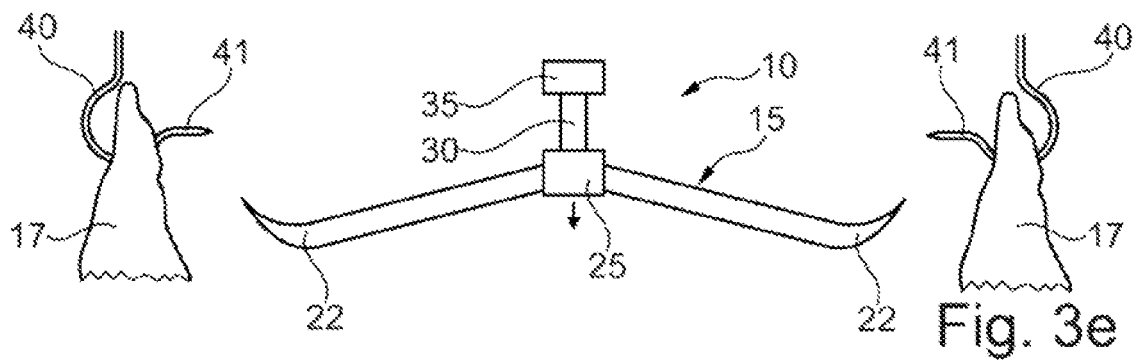

FIG. 3e shows the step when the individual carcass parts 17 have been completely removed from the free ends of the gambrel. In this embodiment, this operation is simultaneous, i.e. the two carcass parts are removed essentially in unison.

FIGS. 4a to 4f shows an embodiment similar to that shown in FIGS. 3a to 3e, with the difference that the actual removal of the carcass parts 17 from the free ends 22 of the gambrel 15 takes place in consecutive steps, first one carcass part then the other, as can be seen in FIGS. 4e and 4f. The steps shown in FIGS. 4a to 4d correspond to those shown in FIGS. 3a to 3d.

A further embodiment is shown in FIGS. 5a to 5d and 6a to 6d. Here, a transfer of a carcass part 17 is made from one single carrier 15' (first carrier), of a first single carrier conveyor (see FIGS. 11a to 1d), to another single carrier 40 (second carrier), of a second single carrier conveyor (see FIGS. 11a to 1d).

FIG. 5a shows an initial step of transfer from one single carrier to another single carrier according to an embodiment of the invention. The location of the tips 41', 41 of the respective single carriers 15', 40 are lined up. The lining up may take place by adjusting the speed of either or both of the first and second single carrier conveyors. The control system may incorporate a vision system (not shown) for detecting the position of the individual opening 18 (see FIG. 1a) in the carcass part. In this case, the control system uses this position information to regulate the conveyor speeds. As can be seen in FIG. 6a, the bottom part 29' of the carrier 15' (first carrier), the leg part of the carcass part is resting in the bottom part, has a vertical position that is higher than the vertical position of the tip of the single carrier 40 (second carrier) and the horizontal distance between the bottom part and the tip may also be considerable.

In FIG. 5b is shown how the tip 41 of the second carrier 40 is inserted into the opening 18 by the use of a guide 70. In FIG. 6b is clear that the vertical distance between the tip 41 and the bottom part 29' of the first carrier 15' has diminished, but the tip 41 is still below the bottom part. The vertical movements may be done by changing the conveyor paths in a vertical direction or by utilizing guides 47 and/or 48 (as shown in FIGS. 8a and 8b and FIG. 9 described below). Alternatively, a tilt guide (see FIGS. 2i and 2j described earlier) may be used to angle one or both carriers perpendicularly with respect to the transport direction of each conveyor. Care must be taken to compensate for the simultaneous displacement of the carriers in both vertical as well as horizontal planes. The full weight of the carcass part 17 is resting on the first carrier 15'.

FIG. 5c shows how the transfer of the carcass part 17 is started by pressing the carcass part from the first carrier 15' towards the second carrier 40. This may be accomplished by using a tapered guide (not shown) acting on the carcass part directly. FIG. 6c shows the lowering of the bottom part 29' of the first carrier, and/or the raising of the tip 41 of the second carrier, so that the weight of the carcass part is gradually transferred to the second carrier. At the end of this step, the full weight of the carcass part rests on the second carrier.

In FIG. 5d is shown the step where the carcass part has been pushed to the bottom part 29 of the second carrier 40 and the first carrier 15' is completely removed from the opening 18 of the carcass part. FIG. 6d shows the tip 41 of the second carrier and the bottom part 29' of the first carrier being separated in the horizontal plane. The first and second conveyors may now continue on to separate goals.

Figure 7:
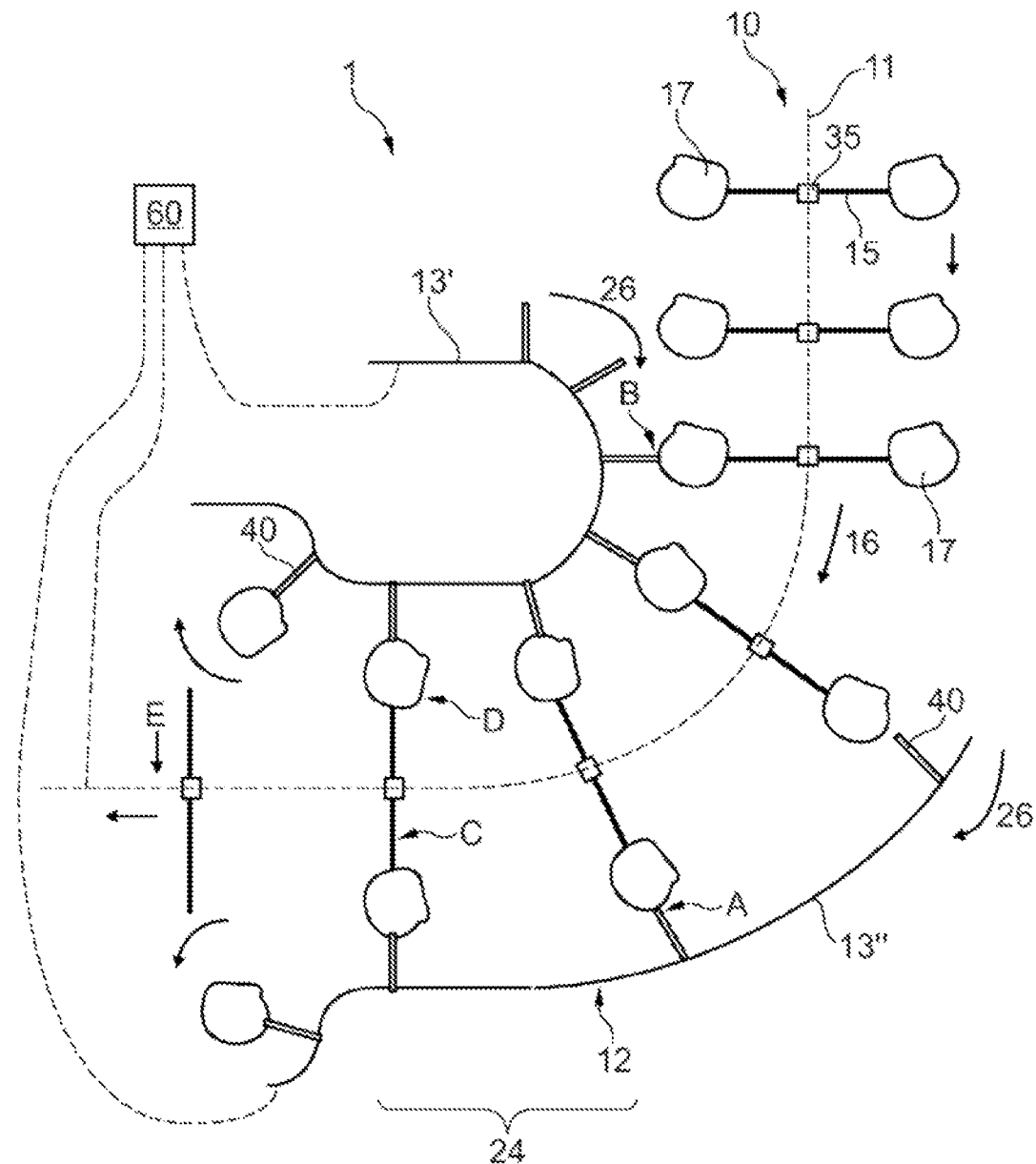
FIG. 7 is a schematic top view showing a gambrel to single carrier transfer system according to an embodiment of the invention, where the gambrel is traveling substantially perpendicular to the direction of travel.

FIG. 7 shows an embodiment of transfer of carcass parts 17 from the gambrel conveyor 10, having a conveyor center line 11, to two sets of single carrier conveyors 13', 13". The features of FIGS. 1a to 1d reoccur in this embodiment and retain their reference numbers. The gambrels 15 are transported in the direction 16 oriented substantially perpendicular to this transport direction, i.e. the free ends 22 of the gambrels are pointing at substantially 90 degrees from the transport direction 16.

A transfer system 1 for transferring carcass parts 17 from the gambrel conveyor 10 to the single carrier transport lines 12 is shown. The carcass parts enter the transfer zone 24 hanging one from each free end 22 (see FIG. 2a, for details) of the individual gambrel (first carrier) 15. The carcass parts may be one right side and one left side of a slaughter animal that has been eviscerated and halved along the spine. Alternatively, the front end of the carcass part, or other carcass parts, may be removed before the gambrel transport line enters the transfer zone. One carcass part is hanging from the opening 18 (see FIG. 1a) arranged in the rear leg of the slaughter animal, one of the free ends 22 of the gambrel 15 penetrating the opening to thereby let the carcass part hang from the gambrel. The animal head may still be attached to one of the right or left sides of the slaughter animal.

The carcass parts on the gambrel conveyor 10 are transported in the direction marked 16 in FIG. 7 and pass in-between two single carrier conveyors, one marked 13' and the other marked 13". The single carrier conveyors are travelling in the direction marked 26. In the transfer zone, direction 16 is parallel to direction 26, and both are heading the same way. The carriers (second carrier) 40 used on each single carrier conveyor may be a standard Euro hook or a modified Euro hook 40 (for details see FIGS. 2b to 2h). The transport system for the gambrel conveyor 10 as well as the single carrier conveyors 13', 13" may be of a known type and will not be described in detail except when changes have been made to the already known types of transport system.

The individual transport speeds of the respective conveyors 10, 13', and 13" may be set using the control system 60, which may be electrically connected to other systems (not shown) up-stream or down-stream of the transfer system 1. The control system may adjust the speed of the single carrier conveyor 13' to align the tip 41 (see FIG. 2b) of the single carrier 40 of this single carrier conveyor to coincide with the location of the opening 18 arranged in the rear leg of the carcass part. Simultaneously, the control system may adjust the speed of the single carrier conveyor 13" to align the tip 41 of the single carrier 40 of this single carrier conveyor to coincide with the location of the opening 18 arranged in the rear leg of the carcass part. The speed adjustments may be in the form of a retardation of one conveyor or an acceleration of one conveyor whilst keeping the speed of another conveyor constant, or combinations of these actions.

The tip of the single carrier of conveyor 13' makes contact/enters the opening 18 at the position marked B in FIG. 7. Conversely, the tip of the single carrier of conveyor 13" makes contact/enters the opening 18 at the position marked A. The transfer of the carcass part is finalized for conveyor 13' at the position marked D and the transfer of the carcass part is finalized for conveyor 13" at the position marked C. The emptied gambrels 15 leave the transfer system 1 at the position marked E.

Figure 11:
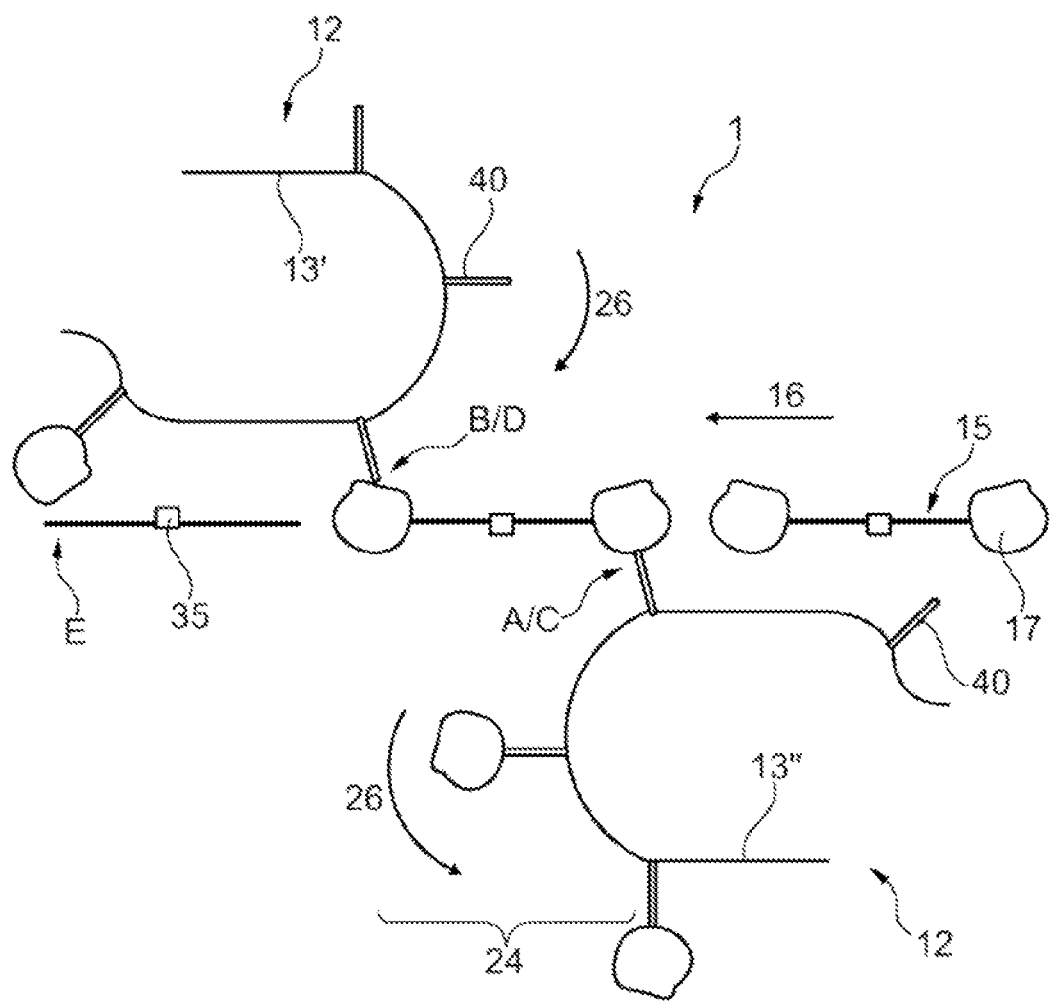
FIG. 11 is a schematic top view showing a gambrel to single carrier transfer system according to a further embodiment of the invention.

FIG. 11 shows a further embodiment of transfer of carcass parts 17 from the gambrel conveyor 10 to two sets of single carrier conveyors 13', 13". Most features of FIGS. 1a to 1c and FIG. 7 reoccur in this embodiment and retain their reference numbers. The gambrels 15 are transported in the direction 16 oriented substantially parallel to this transport direction, i.e. the free ends 22 of the gambrels are pointing substantially in the transport direction 16 (or in the opposite direction). The tip of the single carrier of conveyor 13' makes contact/enters the opening 18 and the transfer of the carcass part is finalized for conveyor 13' at the position marked B/D. Conversely, the tip of the single carrier of conveyor 13" makes contact/enters the opening 18 and the transfer of the carcass part is finalized for conveyor 13" at the position marked A/C. The emptied gambrels 15 leave the transfer system 1 at the position marked E.

This embodiment requires less space than the embodiment shown in FIG. 7, but the transfer time, i.e. the time available for the transfer of the carcass part, is shorter. This may be improved by tilting the single carriers 40 as described earlier when inserting the tips 41 in the carcass part openings 18.

FIGS. 8a and 8b show embodiments of guide arrangements that may be used in the transfer system. In FIGS. 8a and 8b show guides used to stabilize and raise the gambrel 15. A first bottom guide 45, generally shaped to follow a bottom contour of the gambrel, may be used to either to stabilize the gambrel from movement in a rotating direction about the gambrel conveying device 35 and/or to raise the gambrel free ends 22 in a vertical direction. A similar use may be made of second bottom guides 47 shown in FIG. 8b. A first top guide 46, shown in FIG. 8a, may be used to stabilize the gambrel from movement in a rotating direction about the gambrel conveying device 35. Similarly, a second top guide 48, shown in FIG. 8b, may be used to stabilize the gambrel from movement in a rotating direction about the gambrel conveying device 35. All of the bottom guides 45, 47 may have a profile in the travel direction of the gambrel. For example, the guide profile may be lower at an entrance portion of the guides and gradually be raised to a higher profile to push the gambrel upwards by tilting the gambrel backwards and upwards towards the gambrel conveying device 35. In this way, the vertical position of the free ends 22 of the gambrel may be varied with respect to the conveying device depending upon where the gambrel is situated along the profile of the guides.

FIG. 9 shows different arrangements for varying the relative distance between carriers (first carrier or second carrier) by varying the horizontal distance between the conveyors. In one embodiment, the gambrel conveyor 10 is kept straight, whilst a single carrier conveyor 12 is made to change path, either closer to the gambrel conveyor and then back again (top part of FIG. 9), or simply away from the gambrel conveyor (bottom part of FIG. 9).

FIG. 10 shows an embodiment of a vertical height change for a single carrier conveyor 12 carrying single carriers 40 in a transport direction F. The carriers in turn carry carcass parts 17. The conveyor path has an upturn 34 beginning at a desired location and ending at another desired location. The pitch or angle of the upturn corresponds to the desired change in vertical height, marked h. Of course, a corresponding downturn would be realized in a similar way, with a downward angling segment of conveyor.

The above description of possible embodiments of the present invention should not be interpreted as limiting the scope of the present invention. Factors such as cost, mechanical stability and weight of components will dictate what solution is chosen for each case.

CLAUSES

There is furthermore presented an overhang rail transport system and a method for transferring a carcass part from a first carrier to a second carrier of an overhang rail transport system according to the clauses below, which clauses may be combined with any of the preceding claims and/or any of the appended claims:

1. An overhang rail transport system (1), comprising:
a first processing section (10) comprising multiple of spaced apart first carriers (15, 15') for conveying carcass parts (17) of a four-legged slaughter animal, where each of the first carriers comprises a free end (20, 41') designed to extend through an opening in a leg part of one of the carcass parts causing the carcass parts to be at least freely hanging,
at least one second processing section (12) comprising multiple spaced apart second carriers (40, 42) where each of the second carriers comprises a free end (41, 43) designed to engage with the leg part of one of the carcass parts causing the carcass part to be at least freely hanging,
wherein the overhang rail transport system further comprises:
a transfer zone (22) positioned between the first processing section and the at least one second processing section,
a control device (60) for automatically controlling the movement of the first and the second carriers so that upon arrival at the transfer zone the first and the second carriers are synchronized in movement such that:
the first carrier moves in a first direction (16) carrying the carcass part through the opening in the leg part and at least one empty second carrier moving in a second direction (26) meet with their respective free ends (20, 41) facing each other, the transfer zone being designed such that during movement of the first and the second carriers:
the relative horizontal distance between the free end of the first carrier and the free end of the second carrier decreases until the second carrier engages with the carcass part, followed by the weight of the carcass part load being transferred from the first carrier to the second carrier.

2. The overhang rail system (1) according to clause 1, wherein the free end of the second carrier is configured to extend through the opening in the leg part of the carcass part causing the carcass part to be at least freely hanging.

3. The overhang rail system (1) according to clauses 1 or 2,
wherein the transfer zone is further designed so that upon arrival at the transfer zone the height level of the free end of the second carrier is below a height level of the free end of the first carrier such that the decrease in the relative position of the free ends causes the free end of the second carrier to penetrate into the opening at the leg part below the free end of the first carrier.

4. The overhang rail system according to clause 3, wherein the transfer zone is further designed so the relative height level distance between the free end of the first carrier and the free end of the second carrier changes until the height level of the free end of the second carrier is above the height level of the first carrier causing the weight transfer of the carcass part load to the second carrier.

5. The overhang rail system (1) according to any of the preceding clauses, further comprising a guiding device (45, 46, 47, 48, 70), subsequent to the transfer of the carcass part (17) to the second carrier (40, 42), to guide the first carrier (15, 15') and/or the carcass part away from the second carrier resulting in that the second carrier being the sole carrier for the carcass part.

6. The overhang rail system (1) according to clause 5, wherein the guiding device comprises an elongated guiding member (45, 46, 47, 48, 70) arranged relative to the first and second carriers (15, 15' and 40, 42) such that the elongated guiding member interacts with the first carrier and/or the carcass part while the first carrier moves in the first direction (16), the interaction forcing an increase in the relative horizontal distance between the first carrier and the second carrier until a complete separation of the first carrier from the opening in the leg part.

7. The overhang rail system (1) according to any of clauses 4 to 6, wherein the first carrier (15, 15') is slideably attached to a first rail guide (10') and the second carrier is slideably attached to a second rail guide (14), wherein the transfer zone (22) is defined via the internal arrangement of the first and/or the second rail guide causing the change in the relative horizontal distance between the free end (20, 41') of the first carrier and of the free end (41, 43) of the second carrier.

8. The overhang rail system according to any of the clauses 4 to 7, wherein the transfer zone (22) is further defined via the internal arrangement of the height level distance between first and/or the second rail guide causing the change in the relative height level distance between the free end of the first carrier and the free end of the second carrier.

9. The overhang rail system (1) according to any of clauses 1 to 7, wherein the first carrier (15, 15') comprises a gambrel (15) like structure comprising free ends (20) at its opposite ends, where each of the opposite ends carries a carcass part (17), wherein the at least one second processing section (12) includes two second processing sections, wherein the synchronized movement occurs at the opposite ends of the gambrel where empty free ends (41) of second carriers (40) penetrate into the respective opening at the leg parts of the carcass parts.

10. The overhang rail system (1) according to clauses 9, wherein the carcass part is initially transferred from one side of the gambrel (15) while the other side of the gambrel is temporarily supported by the second carrier (40).

11. The overhang rail system (1) according to any of the clauses 1 to 8, wherein the first carrier (15) comprises a hook, more specifically a Euro Hook.

12. The overhang rail system (1) according to any of clauses 1 to 8 or 11, wherein the first carrier (15) is identical to the second carrier (40).

13. The overhang rail system (1) according to any of the preceding clauses, wherein the transfer zone further comprises a support guide such as a tapered guide to interact with a rear side of the first and/or the second shackle type while the second carrier engages with the carcass part and/or while the carcass part is removed from the first shackle and to the second shackle.

14. A method for transferring a carcass part (17) from a first carrier (15, 15') to a second carrier (40, 42) of an overhang rail transport system (1), which overhang rail transport system comprises:
a first processing section (10) comprising multiple of spaced apart first carriers (15, 15') for conveying carcass parts (17) of a four-legged slaughter animal, where each of the first carriers comprises a free end (20, 41') designed to extend through an opening in a leg part of one of the carcass parts causing the carcass parts to be at least freely hanging,
at least one second processing section (12) comprising multiple spaced apart second carriers (40, 42) where each of the second carriers comprises a free end (41, 43) designed to engage with the leg part of one of the carcass parts causing the carcass part to be at least freely hanging,
a transfer zone (22) positioned between the first processing section and the at least one second processing section,
wherein the method comprises:
automatically controlling the movement of the first and the second carriers so that upon arrival at the transfer zone the first and the second carriers are synchronized in movement such that the first carrier moves in a first direction (16) carrying the carcass part through the opening in the leg part and at least one empty second carrier moving in a second direction (26) meet with their respective free ends (20, 41) facing each other, the transfer zone being designed such that during movement of the first and the second carriers the relative horizontal distance between the free end of the first carrier and the free end of the second carrier decreases until the second carrier engages with the carcass part, followed by the weight of the carcass part load being transferred from the first carrier to the second carrier.

The invention claimed is:

1. An overhang rail transport system, comprising:
a first processing section comprising multiple spaced apart first carriers for conveying carcass parts of a four-legged slaughter animal, where each of the first carriers comprises a free end for extending through an opening in a leg part of one of the carcass parts causing the carcass parts to be at least freely hanging,
at least one second processing section comprising multiple spaced apart second carriers where each of the second carriers comprises a free end for engaging with the leg part of one of the carcass parts causing the carcass part to be at least freely hanging, wherein the overhang rail transport system further comprises:
a transfer zone positioned between the first processing section and the at least one second processing section,
a control device for automatically controlling movement of the first and the second carriers so that upon arrival at the transfer zone the first and the second carriers are synchronized in movement such that:
a first carrier amongst the first carriers moves in a first direction carrying the carcass part through the opening in the leg part and at least one empty second carrier moving in a second direction meet with their respective free ends facing each other, the transfer zone being arranged such that during movement of the first and the second carriers:
a relative horizontal distance between the free end of the first carrier and the free end of the second carrier decreases,
the second carrier engages with the carcass part, followed by a weight of a carcass part load being transferred from the first carrier to the second carrier.

2. The overhang rail transport system according to claim 1, wherein the free end of the second carrier is configured to extend through the opening in the leg part of the carcass part causing the carcass part to be at least freely hanging.

3. The overhang rail transport system according to claim 1, wherein the transfer zone is further designed so that upon arrival at the transfer zone a height level of the free end of the second carrier is below a height level of a portion of the first carrier upon which the carcass part is resting such that the movement of the first and the second carriers causes the free end of the second carrier to penetrate into the opening at the leg part below the portion of the first carrier upon which the carcass part is resting.

4. The overhang rail transport system according to claim 3, wherein the transfer zone is further designed so the relative height level distance between the portion of the first carrier upon which the carcass part is resting and a portion of the second carrier suitable for carrying carcass part changes until the height level of the portion of the second carrier suitable for carrying the carcass part is above the height level of the portion of the first carrier upon which the carcass part was resting causing a weight transfer of a carcass part load to the second carrier.

5. The overhang rail transport system according to claim 4, wherein the first carrier is slideably attached to a first rail guide and the second carrier is slideably attached to a second rail guide, wherein the transfer zone is defined via an internal arrangement of the first and/or the second rail guide causing the change in a relative horizontal distance between the free end of the first carrier and of the free end of the second carrier.

6. The overhang rail transport system according to claim 4, wherein the transfer zone is further defined via an internal arrangement of a height level distance between a first rail guide and/or a second rail guide causing the change in the relative height level distance between the first carrier and the second carrier.

7. The overhang rail transport system according to claim 1, further comprising a guiding device, subsequent to the transfer of the carcass part to the second carrier, to guide the first carrier and/or the carcass part away from the second carrier resulting in that the second carrier being the sole carrier for the carcass part.

8. The overhang rail transport system according to claim 7, wherein the guiding device comprises an elongated guiding member arranged relative to the first and second carriers such that the elongated guiding member interacts with the first carrier and/or the carcass part while the first carrier moves in the first direction, the interaction forcing an increase in the relative horizontal distance between the first carrier and the second carrier until a complete separation of the first carrier from the opening in the leg part.

9. The overhang rail transport system according to claim 1, wherein the first carrier comprises a gambrel like structure comprising free ends at its opposite ends, where each of the opposite ends carries a carcass part,
wherein the at least one second processing section includes two second processing sections,
wherein a synchronized movement occurs at the opposite ends of the gambrel where empty free ends of second carriers penetrate into the respective opening at the leg parts of the carcass parts.

10. The overhang rail transport system according to claim 9, wherein the carcass part is initially transferred from one side of the gambrel while the other side of the gambrel is temporarily supported by the second carrier.

11. The overhang rail transport system according to claim 1, wherein the first carrier comprises a hook.

12. The overhang rail transport system according to claim 1, wherein the first carrier is identical to the second carrier.

13. The overhang rail transport system according to claim 1, wherein each processing section is associated with one or more processing steps, such as any one of deboning, deskinning, cooling, buffering and classification.

14. The overhang rail transport system according to claim 1, wherein in the first processing section, a first processing step takes place while the carcass part is on the first carrier, and in the second processing section, a second processing step takes place while the carcass part is on the second carrier.

15. The overhang rail transport system according to claim 1, wherein the transfer zone is arranged such that subsequent to said movement of the first and the second carriers:
a horizontal position of a portion of the first carrier upon which the carcass part is resting, is substantially identical, such as identical to,
a horizontal position of a portion, such as a bottom part of the second carrier suitable for carrying the carcass part.

16. The overhang rail transport system according to claim 1, wherein the first carrier is slideably attached to a first rail guide, such as a first overhanging rail guide, and the second carrier is slideably attached to a second rail guide, such as a second overhanging rail guide.

17. The overhang rail transport system according to claim 1, wherein the multiple first carriers are slideably attached to a first rail guide, such as a first overhanging rail guide, and the second multiple carriers are slideably attached to a second rail guide, such as a second overhanging rail guide.

18. The overhang rail transport system according to claim 1, wherein each of the multiple first carriers travel along the same path as other first carriers when being conveyed along a first rail guide and
wherein each of the multiple second carriers travel along the same path as other second carriers when being conveyed along a second rail guide.

19. The overhang rail transport system according to claim 1, wherein the direction of movement of each of the first carrier and the second carrier is determined by the structure of the overhang rail system, such as by shapes of rails and/or by guiding devices.

20. The overhang rail transport system according to claim 1, wherein the control device is arranged for adjusting a speed of a second carrier conveyor to align a tip of a single carrier to coincide with a location of the opening in the leg part of the carcass part.

21. The overhang rail transport system according to claim 1, wherein the control device is arranged for automatically controlling the movement of the first and the second carriers so that, at a point or period in time, where the weight of the carcass part load being transferred from the first carrier to the second carrier, the horizontal component of the movement of the first carrier is non-zero and substantially identical, such as identical to a horizontal component of the movement of the second carrier.

22. A method for transferring a carcass part from a first carrier to a second carrier of an overhang rail transport system, which overhang rail transport system comprises:
a first processing section comprising multiple spaced apart first carriers for conveying carcass parts of a four-legged slaughter animal, where each of the first carriers comprises a free end for extending through an opening in a leg part of one of the carcass parts causing the carcass parts to be at least freely hanging,
at least one second processing section comprising multiple spaced apart second carriers where each of the second carriers comprises a free end for engaging with the leg part of one of the carcass parts causing the carcass part to be at least freely hanging,
a transfer zone positioned between the first processing section and the at least one second processing section,
wherein the method comprises:
automatically controlling movement of the first and the second carriers so that upon arrival at the transfer zone the first and the second carriers are synchronized in movement such that a first carrier amongst the first carriers moves in a first direction carrying the carcass part through the opening in the leg part and at least one empty second carrier moving in a second direction meet with their respective free ends facing each other, the transfer zone being arranged such that during movement of the first and the second carriers a relative horizontal distance between the free end of the first carrier and the free end of the second carrier decreases and the second carrier engages with the carcass part, followed by a weight of a carcass part load being transferred from the first carrier to the second carrier.

* * * * *